United States Patent
D'Souza et al.

(10) Patent No.: US 10,478,808 B2
(45) Date of Patent: Nov. 19, 2019

(54) SYNTHESIS OF OXYGEN-MOBILITY ENHANCED $CEO_2$ AND USE THEREOF

(71) Applicant: SABIC Global Technologies B.V., Bergen op Zoom (NL)

(72) Inventors: Lawrence D'Souza, Thuwal (SA); Vinu Viswanath, Thuwal (SA); Jessica Scaranto, Thuwal (SA); Ugo Ravon, Thuwal (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 46 days.

(21) Appl. No.: 15/191,844

(22) Filed: Jun. 24, 2016

(65) Prior Publication Data
US 2017/0001176 A1   Jan. 5, 2017

Related U.S. Application Data

(60) Provisional application No. 62/347,808, filed on Jun. 9, 2016, provisional application No. 62/290,726, filed
(Continued)

(51) Int. Cl.
*B01J 7/00*   (2006.01)
*B01J 23/89*   (2006.01)
(Continued)

(52) U.S. Cl.
CPC ............... *B01J 23/892* (2013.01); *B01J 7/00* (2013.01); *B01J 21/04* (2013.01); *B01J 23/10* (2013.01);
(Continued)

(58) Field of Classification Search
CPC ... B01J 21/04; B01J 23/10; B01J 23/18; B01J 23/20; B01J 23/755; B01J 23/8871;
(Continued)

(56) References Cited

U.S. PATENT DOCUMENTS

| 6,808,652 B2 | 10/2004 | Park et al. ..................... 252/373 |
| 7,592,290 B2 | 9/2009 | Hussain et al. ............... 502/335 |

(Continued)

FOREIGN PATENT DOCUMENTS

| CN | 104084211 | 10/2014 |
| KR | 20020021721 | 3/2002 |

(Continued)

OTHER PUBLICATIONS

Reina TR et al: "Catalytic screening of Au/CeO2—MOx/Al2O3catalysts (M=La, Ni, Cu, Fe, Cr, Y) in the CO—PrOx reaction", International Journal of Hydrogen Energy, vol. 40, No. 4, pp. 1782-1788.*
(Continued)

*Primary Examiner* — Amber R Orlando
*Assistant Examiner* — Syed T Iqbal
(74) *Attorney, Agent, or Firm* — Norton Rose Fulbright US LLP

(57) ABSTRACT

Disclosed are catalysts capable of catalyzing the dry reforming of methane. The catalysts have a core-shell structure with the shell surrounding the core. The shell has a redox-metal oxide phase that includes a metal dopant incorporated into the lattice framework of the redox-metal oxide phase. An active metal(s) is deposited on the surface of the shell.

20 Claims, 20 Drawing Sheets

Related U.S. Application Data on Feb. 3, 2016, provisional application No. 62/187,640, filed on Jul. 1, 2015.

(51) Int. Cl.

| | |
|---|---|
| *B01J 37/02* | (2006.01) |
| *B01J 21/04* | (2006.01) |
| *B01J 23/887* | (2006.01) |
| *B01J 35/00* | (2006.01) |
| *B01J 35/02* | (2006.01) |
| *B01J 23/10* | (2006.01) |
| *B01J 23/18* | (2006.01) |
| *B01J 23/20* | (2006.01) |
| *B01J 23/755* | (2006.01) |
| *B01J 37/08* | (2006.01) |
| *C01B 3/40* | (2006.01) |

(52) U.S. Cl.
CPC ............... *B01J 23/18* (2013.01); *B01J 23/20* (2013.01); *B01J 23/755* (2013.01); *B01J 23/8871* (2013.01); *B01J 23/8874* (2013.01); *B01J 23/8877* (2013.01); *B01J 23/894* (2013.01); *B01J 23/896* (2013.01); *B01J 23/898* (2013.01); *B01J 35/0006* (2013.01); *B01J 35/008* (2013.01); *B01J 35/023* (2013.01); *B01J 35/026* (2013.01); *B01J 37/0201* (2013.01); *B01J 37/0205* (2013.01); *B01J 37/0207* (2013.01); *B01J 37/0236* (2013.01); *B01J 37/088* (2013.01); *C01B 3/40* (2013.01); *C01B 2203/0227* (2013.01); *C01B 2203/0238* (2013.01); *C01B 2203/107* (2013.01); *C01B 2203/1058* (2013.01); *C01B 2203/1064* (2013.01); *C01B 2203/1082* (2013.01); *C01B 2203/1247* (2013.01); *Y02P 20/52* (2015.11)

(58) Field of Classification Search
CPC .. B01J 23/8874; B01J 23/8877; B01J 23/892; B01J 23/894; B01J 23/896; B01J 23/898; B01J 35/0006; B01J 35/008; B01J 35/023; B01J 35/026; B01J 37/0201; B01J 37/0205; B01J 37/0207; B01J 37/0236; B01J 37/088; B01J 7/00; C01B 2203/0227; C01B 2203/0238; C01B 2203/1058; C01B 2203/1064; C01B 2203/107; C01B 2203/1082; C01B 2203/1247; C01B 3/40; Y02P 20/52

See application file for complete search history.

(56) References Cited

U.S. PATENT DOCUMENTS

| | | | |
|---|---|---|---|
| 7,824,574 B2 | 11/2010 | White et al. ................... | 252/373 |
| 8,524,119 B2 | 9/2013 | Jun et al. ....................... | 252/373 |
| 8,530,372 B2 | 9/2013 | Luo et al. ...................... | 502/303 |
| 8,729,141 B2 | 5/2014 | Bae et al. ...................... | 518/704 |
| 2011/0114892 A1* | 5/2011 | Jun ........................... | B01J 21/10 252/373 |
| 2011/0237689 A1* | 9/2011 | Bae ....................... | C07C 29/154 518/702 |
| 2014/0001407 A1 | 1/2014 | Milanov et al. .............. | 252/373 |
| 2014/0005042 A1 | 1/2014 | Feaviour ........................ | 502/304 |
| 2014/0097387 A1 | 4/2014 | Biausque et al. ............. | 252/373 |
| 2014/0148332 A1 | 5/2014 | Moon et al. ................... | 502/306 |
| 2014/0332725 A1 | 11/2014 | D'Souza et al. .............. | 252/373 |
| 2014/0332726 A1 | 11/2014 | D'Souza et al. .............. | 252/373 |
| 2015/0014591 A1 | 1/2015 | D'Souza et al. .............. | 252/373 |
| 2015/0014592 A1 | 1/2015 | D'Souza et al. .............. | 252/373 |
| 2015/0073192 A1 | 3/2015 | Cizeron et al. ............... | 585/500 |

FOREIGN PATENT DOCUMENTS

| | | |
|---|---|---|
| WO | WO 2004002611 | 1/2004 |
| WO | WO2014/059992 A1 * | 4/2014 |
| WO | WO 2014059992 | 4/2014 |
| WO | WO 2015006064 | 1/2015 |

OTHER PUBLICATIONS

Yue Bet Al: "Effect of rare earths (La, Pr, Nd, Sm and Y) on the methane combustion over Pd/Ce—Zr/Al2O3 catalysts", Applied Catalysis A: General, Elsevier Science, Amsterdam, NL, vol. 295, No. 1, Oct. 13, 2005 (Oct. 13, 2005), pp. 31-39.*
Supplementary material for "Catalytic screening of Au/CeO2—MOx/Al2O3 catalysts (M=La,Ni,Cu,Fe,Cr,Y) in the CO—PrOx reaction" 2015, International Journal of Hydrogen Energy vol. 40, Issue 4, Jan. 30, 2015, pp. 1782-1788.*
Amjad et al., "Comparative Study on Steam and Oxidative Steam Reforming ofMethane with Noble Metal Catalysts", *Ind. Eng. Chem. Res.*, 52 (44): 15428-15436, 2013.
Basini et al., "Molecular Aspects in Syn-Gas Production: The $CO_2$-Reforming Reaction Case", *J. Catal.*, 157: 162-178, 1995.
Bhattacharyya et al., "$CO_2$ Reforming of Methane to Syngas: Deactivation Behavior of Nickel Aluminate Spinel Catalysts", *Catalyst deactivation, Stud. Surf. Sci. Catal.*, 88: 207-213, 1994.
Blom et al., "Carbon dioxide reforming of methane over lanthanum-modified catalysts in a fluidized-bed reactor", *Catal. Today.*, 21: 535-543, 1994.
Bobin et al., "Mechanism of $CH_4$ Dry Reforming on Nanocrystalline Doped Ceria-Zirconia with Supported Pt, Ru, Ni, and Ni—Ru", *Topics in Catalysis*, 56: 958-968, 2013.
Cai et al., "Autothermal reforming of ethanol for hydrogen production over an Rh/CeO 2 catalyst", Journal: Catalysis Today—Catal Today, 138(3): 152-156, 2008.
Canasco et al., "Theoretical Studies of the Adsorption of CO and C on Ni(111) and Ni/$CeO_2$ (111): Evidence of a Strong Metal-Support Interaction", *J. Phys. Chem. C*, 117(16): 8241-8250, 2013.
Cavendish, "Structural Analysis of Nickel Doped Cerium Oxide Catalysts for Fuel Reforming in Solid Oxide Fuel Cells" Arizona State University (Publisher); M.S. Materials Science and Engineering 2012.
Chen et al., "Conversion of methane and carbon dioxide into synthesis gas over alumina-supported nickel catalysts. Effect of Ni—$Al_2O_3$ interaction", *Catal. Lett.*, 29: 39-48, 1994.
Cheng et al., "The Structural Effect of CeO2 and La2O3 Modified Pd/γ—Al2O3 Catalysts" Acta Phys Chim Sin, 18: 170-174, 2002. (English Abstract Provided).
Chueh et al., "A thermochemical study of ceria: exploiting an old material for new modes of energy conversion and CO2 mitigation", *Phil Trans R Soc A*, 368: 3269-3294, 2010.
Chueh et al., "Ceria as a Thermochemical Reaction Medium for Selectively Generating Syngas or Methane from H2O and CO2", ChemSusChem, 2(8): 735-739, 2009.
Da Fonseca et al., "Nickel / Doped Ceria Solid Oxide Fuel Cell Anodes for DryReforming of Methane", *Journal of the Brazilian Chemical Society*, 25(12): 2356-2363, 2014.
Derk et al., "Catalytic Dry Reforming of Methaneon Ruthenium-Doped Ceria and Ruthenium Supported on Ceria", Topics in Catalysis, 57: 118-124, 2014.
Du et al., "Morphology Dependence of Catalytic Properties of Ni/CeO2Nanostructures for Carbon Dioxide Reforming of Methane" J Phys Chem C, 116(18): 10009-10016, 2012.
Fornasiero et al., "Rh-Loaded CeO2—ZrO2 Solid-Solutions as Highly Efficient Oxygen Exchangers: Dependence of the Reduction Behavior and the Oxygen Storage Capacity on the Structural-Properties", *Journal of Catalysis*, 151: 168-177, 1995.
Frolova-Borchert et al., "Nanocomposites comprised of doped cerium dioxide and lanthanum manganite for syngas production", *Solid State Ionics*, 177: 2533-2538, Oct. 2006.
Gadalla et al., "The role of catalyst support on the activity of nickel for reforming methane with Co2", *Chemical Engineering Science*, 43(11): 3049-3062, 1988.

(56) References Cited

OTHER PUBLICATIONS

Gaudillère et al., "Screening of ceria-based catalysts for internal methane reforming in low temperature SOFC" Journal: Catalysis Today—Catal Today, 157: 263-269, 2010.

Gerber, "Review of Novel Catalysts for Biomass Tar Cracking and Methane Reforming", Oct. 2007, Prepared for the U.S. Department of Energy under Contract DE-AC05-76RL01830.

Godinho et al., "Gadolinium-doped cerium oxide nanorods: novel active catalysts for ethanol reforming", Journal of Materials Science, 45(3): 593-598, 2010.

Guo et al., "$CO_2$ Reforming of $CH_4$ over Nickel and Cobalt Catalysts Prepared from La-Based Perovskite Precursors", *J. Nat. Gas Chem.*, 12: 17-22, 2003.

Guo et al., "La-based perovskite precursors preparation and its catalytic activity for CO2 reforming of CH4", *Mater. Lett.*, 57: 4450-4455, 2003.

Harada et al., "Lattice Oxygen Activity in Pr- and La-Doped CeO2 for Low-Temperature Soot Oxidation", *The Journal of Physical Chemistry Chem*, 118: 559-568, 2013.

Hayakawa et al., "$CO_2$ reforming of $CH_4$ over Ni/perovskite catalysts prepared by solid phase crystallization method", *Appl. Catal. A: General*, 183(2): 273-285, 1999.

Hosokawa et al., "Affinity order among noble metals and CeO2", *Applied Catalysis A: General*, 289: 115-120, 2005.

Inui et al., "Catalytic combustion of natural gas as the role of on-site heat supply in rapid catalytic $CO_2$ $H_2O$ reforming of methane", *Catal. Today*, 26: 295-302, 1995.

Inui, "Spillover effect as the key concept for realizing rapid catalytic reactions", *Stud. Surf Sci. Catal.*, 77: 17-26, 1993.

Jun et al., "Kinetics modeling for the mixed reforming of methane over Ni—CeO2/MgAl2O4 catalyst", *Journal of Natural Gas Chemistry* 20(1):9-17, 2011.

Kambolis et al., "Ni/CeO2—ZrO2 catalysts for the dry reforming of methane", *Applied Catalysis A: General*, 377: 16-26, 2010.

Kim et al., "The reaction of $CO_2$ with $CH_4$ to synthesize $H_2$ and CO over nickel-loaded Y-zeolites", *Catalysis Letters.*, 28: 41-52, 1994.

Kugai et al., "Effects of nanocrystalline CeO2 supports on the properties and performance of Ni—Rh bimetallic catalyst for oxidative steam reforming of ethanol", *Journal of Catalysis*, 238(2): 430-440, 2006.

Le Gal et al., "Dopant Incorporation in Ceria for Enhanced Water-Splitting Activityduring Solar Thermochemical Hydrogen Generation", J. Phys. Chem. C, 116(25): 13516-13523, 2012.

Li et al., "Methane reforming with CO2 to syngas over CeO2-promoted Ni/Al2O3—ZrO2 catalysts prepared via a direct sol-gel process", *Journal of Natural Gas Chemsitry* 20(1):1-8, 2011.

Li et al., "Syngas Generation from Methane Using a Chemical-Looping Concept: A Review of Oxygen Carriers", Journal of Chemistry, vol. 2013 (2013), Article ID 294817, 8 pages.

Liu et al., "CO oxidation Laboratory of Heavy mechanism on Pd-doped CeO2 catalysts: A DFT+U study", State Key Laboratory of Heavy Oil, College of Science, China University of Petroleum; Beijing, 2014.

Makarshin et al., "Syngas production by partial oxidation of methane in a microchannel reactor over a Ni—Pt/La0.2Zr0.4Ce0.4Ox catalyst", *Fuel Processing Technology*, 131: 21-28, 2015.

Mark et al., "$CO_2$-Reforming of Methane on Supported Rh and Ir Catalysts", *J. Catal.*, 164: 122-130, 1996.

Nakamura et al. "Methane reforming with carbon dioxide". *Shokubai (Catalyst)* 35(8):478-484, 1993. (English abstract on p. 484).

Nam et al., "Methane dry reforming over well-dispersed Ni catalyst prepared from perovskite-type mixed oxides", *Stud. Surf. Sci. Catal.*, 119: 843-848, 1998.

Nandini et al., "K-, $CeO_2$-, and Mn-promoted Ni/$Al_2O_3$ catalysts for stable $CO_2$ reforming of methane", *Applied Catalysis A: General*, 290: 166-174, 2005.

Nishikawa et al., "Catalytic performance of Ni/CeO2/Al2O3 modified with noble metals in steam gasification of biomass" Catalysis Today, 131: 146-155, 2008.

Otsuka et al., "Partial Oxidation of Methane Using the Redox of Cerium Oxide", *Chem. Lett*, 22(9): 1517-1520, 1993.

Pechimuthu et al., "Deactivation Studies over Ni—K/CeO2—Al2O3 Catalyst for Dry Reforming of Methane", Ind. Eng. Chem. Res., 46(6): 1731-1736, 2007.

Quaino et al., "Unravelling the enhanced reactivity of bulk CeO2 doped with gallium: A periodic DFT study", *Chemical Physics Letters*, 519-520: 69-72, 2012.

Rangel et al., "Developing novel gas sensors for $NO_2$ detection based on $Ce_{(1-x)}M_xO_2$, {M=Ru, In} solid solutions", *J. Electroccram.*, 28: 34-44, 2012.

Reshetnikov et al., "Effect of oxygen mobility in solid catalyst on transient regimes of catalytic reaction of methane partial oxidation at short contact times", Catalysis Letters, 110(3): 235-242, 2006.

Ribeiro et al., "A Relationship between the Production of Oxygenates from Ethanol/Steam Mixtures and the Oxygen Mobility in Transition Metal Oxide Doped CeO2•SiO2 Catalysts", *J. Phys. Chem. C*, 118(48): 28007-28016, 2014.

Ruckenstein et al., "Carbon dioxide reforming of methane over nickel/alkaline earth metal oxide catalysts", *Appl. Catal.*, 133: 149-161, 1995.

Ruckenstein et al., "Role of Support in $CO_2$ Reforming of $CH_4$ to Syngas over Ni Catalysts", *J. Catal.*, 162: 230-238, 1996.

Rushton et al. "Impact of uniaxial strain and doping on oxygen diffusion in CeO2", *Scientific Reports*, 4: 6068, 2014.

Sadykov et al., "Ceria-Zirconia Nanoparticles Doped with La or Gd: Effect of the Doping Cation on the Real Structure", *Solid State Phenomena*, 128: 81-88, 2007.

Sadykov et al., "Effect of lattice oxygen mobility on the activity of Gd-doped ceria promoted with Pt in syngas generation from methane at short contact times", *Reaction Kinetics and Catalysis Letters*, 85(2): 375-382, 2005.

Sadykov et al., "Methane selective oxidation into syngas by the lattice oxygen in ceria-based solid electrolytes promoted by Pt", Studies in Surface Science and Catalysis, 2004.

Sadykov et al., "Nanocrystalline Doped Ceria-Zirconia Fluorite-Like Solid Solutions Promoted by Pt: Structure, Surface Properties and Catalytic Performance in Syngas Generation", *Mater. Res. Soc. Symp. Proc.* 988:0988-QQ06-04, 2007.

Sadykov et al., "Partial oxidation of methane on Pt-supported lanthanide doped ceria-zirconia oxides: Effect of the surface/lattice oxygen mobility on catalytic performance", *Journal: Catalysis Today—Catal Today*, 169: 125-137, 2011.

Sadykov et al., "Performance of Pr-doped ceria promoted by Pt in syngas generation from methane at short contact times", *Reaction Kinetics and Catalysis Letters*, 86: 29-36, 2005.

Sadykov et al., "Pt-Supported Nanocrystalline Ceria-Zirconia Doped with La, Pr or Gd: Factors Controlling Syngas Generation in Partial Oxidation/Autothermal Reforming of Methane or Oxygenates", In book: Solid State Phenomena, Publisher: Trans Tech Publications Ltd., pp. 239-248, 2007.

Sadykov et al., "Oxygen mobility of Pt-promoted doped CeO2—ZrO2 solid solutions: Characterization and effect on catalytic performance in syngas generation by fuels oxidation/reforming", Catalysis Today; vol. 157, Issues 1-4, Nov. 17, 2010, pp. 55-60; 6th World Congress on Oxidation Catalysis Lille, France, Jul. 5-10, 2009 Towards an integrated approach in innovation and development.

Sayle et al., "Oxygen Transport in Unreduced, Reduced and Rh(III)-Doped CeO2 Nanocrystals" Dept. Environmental and Ordnance Systems, Cranfield University, Faraday Discussions, vol. 134, 2007.

Seshan et al., "Carbon dioxide reforming of methane in the presence of nickel and platinum catalysts supported on $ZrO_2$", *Stud. Surf. Sci. Catal.*, 81: 285-290, 1994.

Takano et al., "Carbon Dioxide Reforming of Methane on Supported Nickel Catalysts", *J. Chem. Eng. Jpn.*, 27: 723-731, 1994.

Vanpoucke et al., "Aliovalent doping of CeO2: DFT study of oxidation state and vacancy effects", *J. Mater. Chem. A*, 2: 13723-13737, 2014.

Vyas, "Chapter 1", *Simulation of Ceria: Bulk and Surface Defects*, Imperial College of London Atomistic Simulation Group Ph.D. Thesis, Apr. 2005. Retrieved from http://abulafia.mt.ic.ac.uk/publications/theses/vyas/Chapter1.pdf on Aug. 1, 2016.

(56) References Cited

OTHER PUBLICATIONS

Wang et al., "Carbon Dioxide reforming of methane to produce synthesis gas over metal-supported catalysts: State-of-the art", *Energy Fuels*, 10(4): 896-904, 1996.

Wang et al., "$CO_2$ reforming of methane on Ni catalysts: Effects of the support phase and preparation technique", *Appl. Catal. B: Environmental*, 16: 269-277, 1998.

Wang et al., "Role of CeO2 in Ni/CeO2—Al2O3 catalysts for carbon dioxide reforming of methane", Applied Catalysis B: Environmental, 19: 267-277, 1998.

Xie, "Understanding of catalyst deactivation caused by sulfur poisoning and carbon deposition in steam reforming of liquid hydrocarbon fuels", Materials Science and Engineering; Doctor of Philosophy; Dissertation; Jan. 14, 2011.

Z. Cheng, Q. Wu, J. Li, and Q. Zhu, "Effects of promoters and preparation procedures on reforming of methane with carbon dioxide over Ni/$Al_2O_3$ catalyst", Catal. Today, 30, 147-155 (1996).

Zhang et al. "Carbon dioxide reforming of methane to synthesis gas over Ni/$La_2O_3$ catalysts", *Applied Catalysis A: General*, 138: 109-133, 1996.

Zheng et al., "CeO2—Al2O3-supported noble metal catalysts for steam reforming of hydrocarbons for fuel cells", *Prepr Pap Am Chem Soc Div Fuel Chem.*, 48(2): 743-5, 2003.

Zhu et al., "Hydrogen and syngas production from two-step steam reforming of methane over CeO2—Fe2O3 oxygen carrier", Journal of Rare Earths, 28(6): 907-913, 2010.

International Search Report and Written Opinion for PCT/IB2016/053780, dated Sep. 23, 2016.

Daza et al., *Fuel* 89:592-603 (2010).

Galetti et al., *Catal. Lett.* 142:1461-1469 (2012).

Reina et al., *International Journal of Hydrogen Energy* 40:1782-1788 (2015), online publication date Dec. 14, 2014.

Yue et al., *Applied Catalysis A: General* 295:31-39 (2005).

\* cited by examiner

SYNTHESIS OF OXYGEN-MOBILITY ENHANCED CEO$_2$ AND USE THEREOF

CROSS REFERENCE TO RELATED APPLICATIONS

This application claims the benefit of priority of U.S. Provisional Patent Application No. 62/187,640, filed Jul. 1, 2015, U.S. Provisional Patent Application No. 62/290,726, filed Feb. 3, 2016, and U.S. Provisional Patent Application No. 62/347,808, filed Jun. 9, 2016. The entire contents of each of the above-referenced applications are incorporated into the present application by reference.

BACKGROUND OF THE INVENTION

A. Field of the Invention

The invention generally concerns the use of a catalyst capable of catalyzing a dry reformation of methane reaction. The catalyst has a core-shell structure with an active metal deposited on the surface of the shell. The shell has a redox-metal oxide phase that includes a metal dopant incorporated into the lattice framework of the redox-metal oxide phase.

B. Description of Related Art

Synthesis gas or "syngas" is a gas mixture that includes carbon monoxide and hydrogen. Syngas is typically used as an intermediary gas to produce a wide range of various products, such as mixed alcohols, hydrogen, ammonia, i-C$_4$ hydrocarbons, mixed alcohols, Fischer-Tropsch products (e.g., waxes, diesel fuels, olefins, gasoline, etc.) methanol, ethanol, aldehydes, alcohols, dimethoxy ethane, methyl tert-butyl ether, acetic acid, gas-to-liquids, butryaldehyde, etc. Syngas can also be used as a direct fuel source, such as for internal combustible engines.

One of the more common methods of producing syngas is by oxidizing hydrocarbon gases such as methane. For instance, the controlled oxidation of methane can be carried out using carbon dioxide, water, oxygen, or a combination of such materials. For industrial scale applications, methane can be reformed into syngas by using steam, as shown in the following reaction:

$$CH_4 + H_2O \rightarrow CO + 3H_2$$

The ratio of CO/H$_2$ obtained in steam reforming process is about 0.33. Many applications, however, require a CO/H$_2$ of about 1.0. Such applications include production of aldehydes, alcohols, acetic anhydride, acetic acid, ethers, and ammonia. Therefore, the current solution is to remove excess H$_2$ from the produced syngas using separation techniques, which can decrease efficient production while simultaneously increasing associated costs. The ratio of CO/H$_2$ may be increased to about 1.0 by dry reforming of methane. In dry reforming of methane, methane is reacted with carbon dioxide or a mixture of carbon dioxide and oxygen as shown in the following equations:

$$CH_4 + CO_2 \rightarrow 2CO + 2H_2$$

$$2CH_4 \pm CO_2 + O_2 \rightarrow 3CO + 3H_2 + H_2O$$

Catalysts are used to increase the rate of the reaction for both of the above reforming reactions. Supported or bulk catalyst containing Group VIII (Columns 8-10) metals are catalytically active towards reforming reactions. By way of example, Ni based catalysts can be used in steam reforming and dry methane reforming, however, the reaction condition for methane dry reforming can be more severe than that of methane steam reforming due to application of high H$_2$O/CH$_4$ ratio in methane steam reforming in comparison with CO$_2$/CH$_4$ ratio in dry reforming reaction. Several studies have shown that the nature of support employed influences the catalytic activity. One problem associated with dry reforming (using carbon dioxide) of methane is that current catalysts are prone to sintering, which reduces the active surface of the catalyst. Other problems associated with steam reforming and dry methane reforming reactions include growth of carbon residuals (e.g., encapsulating carbon, amorphous carbon, carbon whisker, filamentous carbon, and graphite) on the surface of the supported catalyst. Carbon growth can lead to deactivation of the catalyst due to blockage of catalytic sites (e.g., metal sites), degradation of the catalyst, reactor plugging or combinations thereof.

Several recent disclosures have focused on to improving the activity and life of reforming catalysts by attempting to control the size of the particle deposited on the surface of the support. By way of example U.S. Patent Publication No. 2014/0097387 to Biausque et al. discloses the synthesis of nickel-platinum (NiPt) nanoparticles and depositing the nanoparticles on an alumina, silica, titania or activated carbon support. U.S. Patent Publication No. 2014/0005042 to Feaviour describes a method of making a steam reforming catalyst that includes spraying a support with catalytic metals. Other disclosures have focused on methods to improving the support for various catalytic materials. For example, U.S. Patent Application No. 2014/0332726 to D' Souza et al. describes synthesis of La$_2$Zr$_{0.88}$Rh$_{0.12}$O$_7$ pyrochlore catalysts grafted on a bimetal oxide support (e.g., MgAl$_2$O$_4$ support).

Even further, the cost of rare earth or noble metals used in the catalysts can be significant. Further, the associated methods for preparing such catalysts can be inefficient and can suffer from scalability for commercial manufacturing processes. Still further, many of the currently available catalysts suffer from mechanical strength issues and can mechanically break down during use.

One approach to improving the efficiency of reforming reactions is to develop catalysts that can catalyze a combination steam reforming and carbon dioxide reforming reaction (e.g., CH$_4$/CO$_2$/H$_2$O). By way of example, Ni based catalysts can be used in steam reforming and dry methane reforming, however, the reaction conditions for methane dry reforming can be more severe than that of methane steam reforming due to application of high H$_2$O/CH$_4$ ratio in methane steam reforming in comparison with CO$_2$/CH$_4$ ratio in dry reforming reaction. In yet another example, U.S. Pat. No. 8,729,141 to Bae et al., and U.S. Pat. No. 8,524,119 to Jun et al. disclose a Ni/Ce/MgAlO$_x$, or Ni/Ce—Zr/MgAlO$_x$ catalyst for the combined reforming of natural gas and carbon dioxide. U.S. Patent Application Publication No. 2014/0148332 to Moon et al. describes a bi-catalyst for the combination of steam and dry reforming of methane (e.g., CH$_4$/CO$_2$/H$_2$O) that includes a mixture of Ni/MgO/Al$_2$O$_3$ (catalyst 1) and metal oxide catalyst (catalyst 2) that includes magnesia, nickel, vanadium, tungsten, iron, molybdenum or chromium. Jun et al. ("Kinetics modeling for the mixed reforming of methane over Ni—CeO$_2$/MgAl$_2$O$_4$ catalyst", *Journal of Natural Gas Chemistry*, 2011, Vol. 20, pp. 9-17) describes the modeling of a Ni—CeO$_2$/MgAl$_2$O$_4$ catalyst in a combined steam and dry methane reforming reaction, which excluded the parameter of catalyst deactivation by coking. These catalysts suffer in that they are prone to carbon growth at high pressures.

SUMMARY OF THE INVENTION

A solution to the problems associated with the costs, deactivation, and degradation or loss of mechanical strength of dry reformation of methane catalysts has been discovered. The solution lies in a catalyst having a particular core-shell structure. The core-shell structure can include a chemically inert core surrounded by a shell with an active/catalytic metal deposited on the surface of the shell. The shell has a redox-metal oxide phase (e.g., a cerium dioxide ($CeO_2$) phase) that has a metal dopant (e.g., Nb, In, Ga, and La) incorporated into the lattice framework of the redox-metal oxide phase. Without wishing to be bound by theory, it is believed that this structural set-up provides a number of advantages in the dry reformation of methane reaction. For example, the core-shell structure can provide for increased mechanical strength and decreased production costs. Also, doping of the redox-metal oxide phase of the shell is believed to create a relatively high concentration of defects in its lattice structure, thereby allowing for improved oxygen mobility and increased oxygen vacancies in the lattice structure. This, in turn, increases the phase's reducibility and favors a continuous removal of carbon deposits from its active sites. Further, the oxygen mobility feature can be tunable by varying the thickness of the shell layer (e.g., shell layer thickness can be modified to be 1 atomic layer to 100 atomic multilayers). This results in dry reformation of methane catalysts of the present invention that (1) are economically viable to produce, (2) have sufficient mechanical strength, (3) are highly active, and/or (4) are resistant to coking and sintering.

Still further, a discovery has been made that overcomes coke formation in high and low pressure reforming applications. The discovery is premised on the use of a catalyst having a core-shell structure with an active metal deposited on the surface of the shell. The shell is formed of a doped metal oxide that can undergo reduction and oxidation reactions (redox) and the core is an alkaline earth aluminate having a high affinity towards carbon dioxide. The thickness of the shell can be varied to tune the oxygen mobility of the catalytic material. Catalysts prepared in this manner have reduced coking and sintering issues during the oxidation of methane reaction. Without wishing to be bound by theory, it is believed that due to the alkaline earth aluminate's (e.g., $MgAl_2O_4$) high affinity towards $CO_2$, the support adsorbs more carbon dioxide and helps to oxidize carbon formed on the catalysts as shown in following equation:

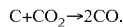

$$C+CO_2 \rightarrow 2CO.$$

In a particular aspect of the present invention, there is disclosed a catalyst capable of catalyzing a dry reformation of methane reaction. The catalyst can include a core-shell structure having a metal oxide core (e.g., $Al_2O_3$, alkaline earth metal aluminate, $SiO_2$, $TiO_2$, zeolites, amorphous silica alumina, clays, olivine sand, spinels, perovskites, MgO, or $ZrO_2$, preferably $Al_2O_3$ or gamma-$Al_2O_3$ or alkaline earth metal aluminate, a shell surrounding the core, and a metal (e.g., nickel, rhodium, ruthenium, platinum, or any combination thereof) deposited on the surface of the shell. Non-limiting examples of alkaline earth aluminates that can be used in the context of the present invention include magnesium aluminate, calcium aluminate, strontium aluminate, barium aluminate, or any combination thereof, preferably magnesium aluminate. In some instances, the catalyst does not include a metal dopant, but includes two or more metals deposited on the surface of the redox-metal oxide shell. The core can be chemically inert during the dry reforming of methane reaction and can also provide sufficient mechanical support for the reactive shell of the catalyst. The shell can have a redox-metal oxide phase that includes a metal dopant (e.g., indium, niobium, or both) incorporated into the lattice framework of the redox-metal oxide phase. The shell can have a greater oxygen mobility when compared with the core. In one particular aspect, the core is $Al_2O_3$, the redox-metal oxide phase is cerium dioxide, the metal dopant is indium or niobium or both, and the metal deposited on the surface of the shell is nickel, rhodium, ruthenium, or platinum or any combination thereof (e.g., nickel, nickel and platinum or nickel and rhodium). The shell can have a thickness of one atomic monolayer to 100 atomic multilayers (e.g., 1, 10, 20, 30, 40, 50, 60, 70, 80, 90, or 100 atoms thick). In some aspects, the catalyst includes 5 to 50 wt. %, preferably 7 to 20 wt. %, and more preferably from 9 to 15 wt. % of the redox metal oxide phase; 0.1 to 5 wt. %, preferably, 0.75 to 4 wt. %, or more preferably 1 to 3 wt. % of the metal dopant; 1 to 40 wt. %, preferably, 2 to 15 wt. %, or more preferably 5 to 12 wt. % of the metal deposited on the surface of the shell, or combinations thereof. The catalyst can be in particulate form. In some instances, the catalyst has a mean particle size of 100 to 1000 μm, preferably, 200 to 800 μm, or more preferably from 250 to 550 μm. In certain aspects of the invention, the catalyst is self-support, however, the catalyst can be supported by a substrate (e.g., glass, a polymer bead, or a metal oxide).

In some aspects, a system for producing hydrogen ($H_2$) and carbon monoxide (CO) from methane ($CH_4$) and carbon dioxide ($CO_2$) is described. The system can include an inlet for a reactant feed containing methane and oxygen, a reaction zone that can be configured to be in fluid communication with the inlet, and an outlet configured to be in fluid communication with the reaction zone and configured to remove a first product stream including $H_2$ and CO from the reaction zone. The reaction zone contains the catalyst of the present invention having the core-shell technology described through the specification. The reaction zone of the disclosed system can further include the reactant feed and the first product stream. The reaction zone of the system can be a continuous flow reactor selected from a fixed-bed reactor, a fluidized reactor, or a moving bed reactor.

Another aspect of the invention includes a method of producing hydrogen ($H_2$) and carbon monoxide (CO) from methane ($CH_4$) and carbon dioxide ($CO_2$). The method can include contacting a reactant gas stream that includes $CH_4$ and $CO_2$ with any one of the catalysts of the present invention described throughout the specification under substantially dry reaction conditions sufficient to produce a product gas stream comprising $H_2$ and CO. The substantially dry reaction conditions may include a pressure of 1 bar to 35 bar, preferably, 1 bar to 20 bar, a temperature of 750° C. to 1000° C., preferably 750° C. to 950° C., and a GHSV of 500 $h^{-1}$ to 100,000 $h^{-1}$, preferably 1000 $h^{-1}$ to 60,000 $h^{-1}$. In some particular embodiments, the methane conversion in the reaction can be 60 to 80%, preferably 65 to 75%, after 300 hours on the stream at a temperature of 750 to 850° C., a pressure of about 1 bara, and a GHSV of 70,000 $h^{-1}$ to 75,000 $h^{-1}$. The hydrogen gas to carbon monoxide ratio ($H_2$/CO) can range from 0.5 to 0.8 at these conditions. It was found that at a $H_2$/CO ratio of 0.8 the core-shell catalysts of the present invention were very stable. In some aspects, growth of carbon residuals (e.g., coke formation) on the catalyst is substantially or completely inhibited.

The catalyst of the present invention can be made by (a) obtaining a solution that includes a first metal salt and a second metal salt solubilized in the solution, (b) impregnating a metal oxide core, a clay core, or a zeolite core, with the solution to obtain an impregnated material, (c) drying and calcining the impregnated material to obtain a core-shell structure having: (i) a metal oxide core, a clay core, or a zeolite core; and (ii) a shell surrounding the core, and (d) depositing an active metal(s) on the surface of the shell. The shell has an redox-metal oxide phase formed from the first metal salt and a metal dopant formed from the second metal salt that is incorporated into the lattice framework of the redox-metal oxide phase. The weight ratio of the first metal salt to the second metal salt present in the solution can be at least 5:1, preferably 5:1 to 30:1, more preferably 7:1 to 20:1, and most preferably 10:1 to 15:1. In some aspects of the invention, the impregnated material can be dried at a temperature of 50 to 150° C. for 2 to 10 hours and calcined at a temperature of 500 to 800° C. for 2 to 4 hours.

Also disclosed in the context of the present invention are embodiments 1-28. Embodiment 1 is a catalyst capable of catalyzing a dry reformation of methane reaction, the catalyst comprising a core-shell structure having: a metal oxide core, a clay core, or a zeolite core; a shell surrounding the core, wherein the shell has a redox-metal oxide phase that includes a metal dopant incorporated into the lattice framework of the redox-metal oxide phase; and an active metal deposited on the surface of the shell. Embodiment 2 is the catalyst of claim 1, wherein the core is a metal oxide core having $Al_2O_3$, an alkaline earth metal aluminate (e.g., aluminate, magnesium aluminate, calcium aluminate, strontium aluminate, barium aluminate, or any combination thereof, preferably magnesium aluminate), $SiO_2$, $TiO_2$, a zeolite, amorphous silica alumina, a clay, olivine sand, a spinel, a perovskite, MgO, or $ZrO_2$, preferably $Al_2O_3$ or magnesium aluminate. Embodiment 3 is the catalyst of any one of embodiments 1 to 2, wherein the redox-metal oxide phase is a cerium oxide phase, an iron oxide phase, a titanium dioxide phase, a manganese oxide phase, a niobium oxide phase, a tungsten oxide phase, or a zirconium oxide phase, preferably a cerium oxide phase. Embodiment 4 is the catalyst of any one of embodiments 1 to 3, wherein the metal dopant is indium, gallium, niobium, lanthanum, germanium, arsenic, selenium, tin, antimony, tellurium, thallium, lead, or any combination thereof, preferably indium. Embodiment 5 is the catalyst of any one of embodiments 1 to 4, wherein the metal deposited on the surface of the shell is nickel, rhodium, ruthenium, iridium, platinum, palladium, gold, silver, palladium, cobalt, manganese, copper, or any combination thereof, preferably nickel, rhodium, ruthenium, or platinum. Embodiment 6 is the catalyst of embodiment 1, wherein the core is $Al_2O_3$, the redox-metal oxide phase is cerium dioxide, the metal dopant is indium or niobium or both, and the metal deposited on the surface of the shell is nickel, rhodium, ruthenium, or platinum or any combination thereof. Embodiment 7 is the catalyst of embodiment 6, wherein the metal dopant is indium. Embodiment 8 is the catalyst of embodiment 6, wherein the metal dopant is niobium. Embodiment 9 is the catalyst of any one of embodiments 6 to 8, wherein the metal deposited on the surface shell is nickel, nickel and platinum, or nickel and rhodium. Embodiment 10 is the catalyst of any one of embodiments 1 to 9, wherein the shell has a thickness of one atomic monolayer to 100 atomic multilayers. Embodiment 11 is the catalyst of any one of embodiments 1 to 10, wherein the catalyst includes 5 to 50 wt. %, preferably 7 to 20 wt. %, and more preferably from 9 to 15 wt. % of the redox metal oxide phase. Embodiment 12 is the catalyst of any one of embodiments 1 to 11, wherein the catalyst includes 0.1 to 5 wt. %, preferably, 0.75 to 4 wt. %, or more preferably 1 to 3 wt. % of the metal dopant. Embodiment 13 is the catalyst of any one of embodiments 1 to 12, wherein the catalyst includes 1 to 40 wt. %, preferably, 2 to 15 wt. %, or more preferably 5 to 12 wt. % of the metal deposited on the surface of the shell. Embodiment 14 is the catalyst of any one of embodiments 1 to 13, wherein the catalyst is in particulate form. Embodiment 15 is the catalyst of embodiment 14, wherein the catalyst has a mean particle size of 100 to 1000 µm, preferably, 200 to 800 µm, or more preferably from 250 to 550 µm. Embodiment 16 is the catalyst of any one of embodiments 1 to 15, wherein the catalyst is self-supported. Embodiment 17 is the catalyst of any one of embodiments 1 to 16, wherein the catalyst is supported by a substrate, wherein the substrate comprises glass, a polymer bead, or a metal oxide. Embodiment 18 is the catalyst of any one of embodiments 1 to 17, wherein the metal oxide core, the clay core, or the zeolite core is chemically inert during the dry reformation of methane reaction. Embodiment 19 is the catalyst of any one of embodiments 1 to 18, wherein the shell has a greater oxygen mobility when compared with the core. Embodiment 20 is a system for producing hydrogen ($H_2$) and carbon monoxide (CO) from methane ($CH_4$) and carbon dioxide ($CO_2$), the system comprising: an inlet for a reactant feed comprising $CH_4$ and $CO_2$; a reaction zone that is configured to be in fluid communication with the inlet, wherein the reaction zone comprises the catalyst of any one of embodiments 1 to 19; and an outlet configured to be in fluid communication with the reaction zone and configured to remove a first product stream comprising $H_2$ and CO from the reaction zone. Embodiment 21 is the system of embodiment 20, wherein the reaction zone further comprises the reactant feed and the first product stream. Embodiment 22 is the system of any one of embodiments 20 to 21, wherein the reaction zone is a continuous flow reactor selected from a fixed-bed reactor, a fluidized reactor, or a moving bed reactor. Embodiment 23 is a method of producing hydrogen ($H_2$) and carbon monoxide (CO) from methane ($CH_4$) and carbon dioxide ($CO_2$), the method comprising contacting a reactant gas stream that includes $CH_4$ and $CO_2$ with any one of the catalysts of embodiments 1 to 19 under substantially dry reaction conditions sufficient to produce a product gas stream comprising $H_2$ and CO. Embodiment 24 is the method of embodiment 23, wherein methane conversion is 60 to 80%, preferably 65 to 75%, after 300 hours on the stream at a temperature of 750 to 850° C., a pressure of about 1 bara, and a GHSV of 70,000 $h^{-1}$ to 75,000 $h^{-1}$. Embodiment 25 is the method of embodiment 23, wherein the reaction conditions include a temperature of 700° C. to 950° C., a pressure of about 1 bara, and a gas hourly space velocity of 500 $h^{-1}$ to 100,000 $h^{-1}$. Embodiment 26 is the method of any one of embodiments 23 to 25, wherein coke formation on the catalyst is substantially or completely inhibited. Embodiment 26 is a method of making a catalyst of any one of embodiments 1 to 19, the method comprising: (a) obtaining a solution comprising a first metal salt and a second metal salt solubilized in the solution, wherein the weight ratio of the first metal salt to the second metal salt present in the solution is at least 5:1, preferably 5:1 to 30:1, more preferably 7:1 to 20:1, and most preferably 10:1 to 15:1; (b) impregnating a metal oxide core, a clay core, or a zeolite core, with the solution to obtain an impregnated material; (c) drying and calcining the impregnated material to obtain a core-shell structure having: (i) a metal oxide core, a clay core, or a zeolite core; and (ii) a shell surrounding the core, wherein the shell has a redox-metal oxide phase formed from the first metal salt and a metal dopant formed from the second metal salt that is incorporated into the lattice framework of the redox-metal oxide phase; and (d) depositing one or more active metals on the surface of the shell. Embodiment 28 is the method of embodiment 27, wherein the impregnated material is dried at a temperature of 50 to 150° C. for 2 to 10 hours and calcined at a temperature of 500 to 800° C. for 2 to 4 hours.

Also disclosed in the context of the present invention are aspects 1-40. In a first aspect, a catalyst capable of catalyzing a dry reformation of methane reaction is described. The catalyst can include an alkaline earth metal aluminate core; a redox-metal oxide layer deposited on a surface of the alkaline aluminate core and having a metal dopant incorporated into the lattice framework of the redox-metal oxide layer; and an active metal deposited on the surface of the redox-metal oxide layer. Aspect 2 is the catalyst of aspect 1, wherein the alkaline earth metal aluminate core is magnesium aluminate; the redox-metal oxide layer is cerium oxide ($CeO_2$) and the metal dopant is niobium (Nb), indium (In), or lanthanum (La), or any combination thereof; and the active metal is nickel. Aspect 3 is the catalyst of aspect 2 that includes 65 wt. % to 85 wt. % magnesium aluminate; 10 wt. % to 20 wt. % cerium oxide; and 5 wt. % to 10 wt. % nickel. Aspect 4 is the catalyst of aspect 3 that includes 0.5 wt. % to 2 wt. % of niobium incorporated into the lattice framework of the cerium oxide layer. Aspect 5 is the catalyst of aspect 3 that includes 0.5 wt. % to 2 wt. % of indium incorporated into the lattice framework of the cerium oxide layer. Aspect 6 is the catalyst of aspect 3 that includes 0.5 wt. % to 2 wt. % of lanthanum incorporated into the lattice framework of the cerium oxide layer. Aspect 7 is the catalyst of any one of aspects 1 to 6, wherein the redox-metal oxide layer has a thickness of 1 nanometer (nm) to 500 nm, preferably 1 nm to 100 nm, or more preferably 1 nm to 10 nm. Aspect 8 is the catalyst of any one of aspects 1 to 7, wherein the redox-metal oxide layer is a continuous layer. Aspect 9 is the catalyst of any one of aspects 1 to 7, wherein the redox-metal oxide layer is a discontinuous layer. Aspect 10 is the catalyst of any one of aspects 1 to 8, wherein catalyst has a core/shell structure where the redox-metal oxide layer surrounds the alkaline earth metal aluminate core. Aspect 11 is the catalyst of any one of aspects 1 to 10, wherein the alkaline earth metal aluminate core has a spherical shape, a cylindrical shape, a hollow cylindrical shape, a pellet shape, or is shaped to have 2-lobes, 3-lobes, or 4 lobes, or is a monolith. Aspect 12 is the catalyst of any one of aspects 1 to 11, wherein the catalyst is in particulate form. Aspect 13 is the catalyst of aspect 12, wherein the catalyst has a mean particle size of 100 to 1000 μm, preferably, 200 to 800 μm, or more preferably from 250 to 550 μm. Aspect 14 is the catalyst of any one of aspects 1 to 13, wherein the catalyst is self-supported. Aspect 15 is the catalyst of any one of aspects 1 to 13, wherein the catalyst is supported by a substrate. Aspect 16 is the catalyst of aspect 15 wherein the substrate includes glass, a polymer bead, or a metal oxide. Aspect 17 is the catalyst of any one of aspects 1 to 16, wherein the alkaline earth metal aluminate core is chemically inert during a dry reformation of methane reaction, steam reforming or partial oxidation of methane. Aspect 18 is the catalyst of any one of aspects 1 to 17, wherein the redox-metal oxide layer has a greater oxygen mobility when compared with the core. Aspect 19 is the catalyst of any one of aspects 1 and 7 to 18, wherein the alkaline earth metal aluminate core is aluminate, magnesium aluminate, calcium aluminate, strontium aluminate, barium aluminate, or any combination thereof. Aspect 20 is the catalyst of any one of aspects 1 and 7 to 19, wherein the redox-metal oxide layer is a cerium oxide layer, an iron oxide layer, a titanium dioxide layer, a manganese oxide layer, a niobium oxide layer, a tungsten oxide layer, a zirconium oxide layer, olivine, or a cerium-zirconia ($Ce_xZr_yO_2$) layer. Aspect 21 is the catalyst of any one of aspects 1 and 7 to 20, wherein the metal dopant is indium (In), gallium (Ga), niobium (Nb), lanthanum (La), bismuth (Bi), germanium (Ge), arsenic (As), selenium (Se), tin (Sn), antimony (Sb), tellurium (Te), thallium (Tl), lead (Pb), or any combination thereof. Aspect 22 is the catalyst of any one of aspects 1 and 7 to 21, wherein the active metal deposited on the surface of the redox-metal oxide layer is a metal or metal alloy. Aspect 23 is the catalyst of aspect 22, wherein the active metal is nickel (Ni), rhodium (Rh), ruthenium (Ru), iridium (Ir), platinum (Pt), palladium (Pd), gold (Au), silver (Ag), cobalt (Co), manganese (Mn), copper (Cu), zinc (Zn), iron (Fe), molybdenum (Mo), or zirconium (Zr), or any combination or alloy thereof. Aspect 24 is the catalyst of aspect 23, wherein the active metal is a binary alloy (M1M2) or a tertiary alloy (M1M2M3), wherein M1 is nickel (Ni), and M2 and M3 are each rhodium (Rh), ruthenium (Ru), iridium (Ir), platinum (Pt), palladium (Pd), gold (Au), silver (Ag), cobalt (Co), manganese (Mn), copper (Cu), zinc (Zn), iron (Fe), molybdenum (Mo), or zirconium (Zr). Aspect 25 is the catalyst of aspect 24, wherein the active metal is the binary alloy (M1M2), wherein M1 is nickel and M2 is rhodium (Rh) or platinum (Pt). Aspect 26 is the catalyst of any one of aspects 1 and 7 to 25, wherein the alkaline earth metal aluminate core is magnesium aluminate, the redox-metal oxide layer is a cerium oxide layer, and the metal dopant is niobium (Nb), gallium (Ga), lanthanum (La), indium (In), or bismuth (Bi), or any combination thereof, and wherein the active metal is nickel (Ni), nickel (Ni) rhodium (Rh) alloy, nickel (Ni) platinum (Ir) alloy, nickel (Ni) platinum (Ru) alloy, nickel (Ni) platinum (Pd) alloy or nickel (Ni) platinum (Pt) alloy. Aspect 27 is the catalyst of any one of aspects 25 to 26, wherein the magnesium aluminate includes 5 wt. % to 60 wt. % MgO. Aspect 28 is the catalyst of any one of aspects 1 and 7 to 27 that includes 50 wt. % to 90 wt. %, preferably 60 wt. % to 80 wt. %, or more preferably 70 wt. % to 80 wt. % of the alkaline earth metal aluminate core; 5 wt. % to 50 wt. % preferably 7 wt. % to 20 wt. %, or more preferably 13 wt. % to 17 wt. % of the redox metal oxide layer deposited on a surface of the alkaline earth metal aluminate core; 0.1 wt. % to 5 wt. %, preferably 0.75 wt. % to 4 wt. %, or more preferably 1 wt. % to 3 wt. % of the metal dopant incorporated into the lattice framework of the redox-metal oxide layer; and 1 wt. % to 40 wt. %, preferably 2 wt. % to 15 wt. %, more preferably 5 wt. % to 12 wt. %, of the active metal(s) deposited on the surface of the redox-metal oxide layer. Aspect 29 is a system for producing hydrogen ($H_2$) and carbon monoxide (CO) from methane ($CH_4$) and carbon dioxide ($CO_2$). The system can include an inlet for a reactant feed comprising $CH_4$ and $CO_2$; a reaction zone that is configured to be in fluid communication with the inlet, wherein the reaction zone comprises the catalyst of any one of aspects 1 to 28; and an outlet configured to be in fluid communication with the reaction zone and configured to remove a first product stream comprising $H_2$ and CO from the reaction zone. Aspect 30 is the system of aspect 29, wherein the reaction zone further comprises the reactant feed and the first product stream. Aspect 31 is the system of any one of aspects 29 to 30, wherein the reactant feed further comprises oxygen ($O_2$) or $H_2O$. Aspect 32 is the system of any one of aspects 29 to 31, wherein the reaction zone is a continuous flow reactor selected from a fixed-bed reactor, a fluidized reactor, or a moving bed reactor. Aspect 33 describes a method of producing hydrogen ($H_2$) and carbon monoxide (CO) from methane ($CH_4$) and carbon dioxide ($CO_2$). The method of aspect 33 can include contacting a reactant gas stream that includes CH$_4$ and CO$_2$ with any one of the catalysts of aspects 1 to 28 under substantially dry reaction conditions sufficient to produce a product gas stream comprising H$_2$ and CO. Aspect 34 is the method of aspect 33, wherein the substantially dry reaction conditions comprise a pressure of 1 bar to 35 bar, preferably, 1 bar to 20 bar, a temperature of 750° C. to 1000° C., preferably 750° C. to 950° C., and a GHSV of 500 h$^{-1}$ to 100,000 h$^{-1}$, preferably 1000 h$^{-1}$ to 60,000 h$^{-1}$. Aspect 35 is the method of any one of aspects 33 to 34, wherein the reactant gas stream further comprises an inert carrier gas. Aspect 36 is the method of any one of aspects 33 to 35, wherein the reactant gas stream further comprises oxygen. Aspect 37 is the method of any one of aspects 33 to 36, wherein coke formation on the catalyst is substantially or completely inhibited. Aspect 38 described a method of making a catalyst of any one of aspects 1 to 28. The method of aspect 38 can include (a) obtaining a solution comprising a first metal salt and a second metal salt solubilized in the solution, wherein the weight ratio of the first metal salt to the second metal salt present in the solution is at least 5:1, preferably 5:1 to 30:1, more preferably 7:1 to 20:1, and most preferably 10:1 to 15:1; (b) performing a pore volume impregnation on an alkaline earth metal aluminate core with the solution to obtain an impregnated material; (c) drying and calcining the impregnated material to obtain a structure having: (i) an alkaline earth metal aluminate core; and (ii) a redox-metal oxide layer deposited on a surface of the core, wherein the redox-metal oxide layer is formed from the first metal salt and a metal dopant is formed from the second metal salt that is incorporated into the lattice framework of the redox-metal oxide layer; and (d) depositing one or more active metals on the surface of the redox-metal oxide layer and drying and calcining the material to obtain the catalyst of any one of aspects 1 to 28. Aspect 39 is the method of aspect 38, wherein the impregnated material in step (c) is dried at a temperature of 50° C. to 150° C. for 1 hour to 10 hours and calcined at a temperature of 450° C. to 650° C. for 2 hours to 4 hours. Aspect 40 is the method of aspect 39, wherein the material from step (d) is dried at a temperature of 50° C. to 150° C. for 1 hours to 10 hours and calcined at a temperature of 800° C. to 1000° C. for 2 hours to 4 hours.

The terms "oxygen mobility" refers to the ease at which an oxygen ion (O) is removed from a metal oxide and is related to the crystal defects in the metal oxide crystal lattice. In the case of CeO$_{2-x}$ denotes the removable oxygen or mobile oxygen available for redox reaction.

The term "catalyst" means a substance which alters the rate of a chemical reaction. A catalyst may either increase the chemical reaction rate (i.e., a "positive catalyst") or decrease the reaction rate (i.e., a "negative catalyst"). Catalysts participate in a reaction in a cyclic fashion such that the catalyst is cyclically regenerated. "Catalytic" means having the properties of a catalyst.

The term "dopant" or "doping agent" is an impurity added to or incorporated within a catalyst to optimize catalytic performance (e.g. increase or decrease catalytic activity). As compared to the undoped catalyst, a doped catalyst may increase or decrease the selectivity, conversion, and/or yield of a reaction catalyzed by the catalyst. Doped and promoted are used interchangeably throughout the disclosure.

The terms "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "wt. %" or "vol. %" refers to a weight or volume percentage of a component, respectively, based on the total weight or the total volume of material that includes the component. In a non-limiting example, 10 grams of component in 100 grams of the material that includes the component is 10 wt. % of component.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the catalysts of the present invention are their abilities to catalyze dry reforming of methane.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

The currently available catalysts used to reform hydrocarbons into syngas are prone to growth of carbon residuals (e.g., coke and carbon whiskers) and sintering which can lead to inefficient catalyst performance and ultimately failure of the catalyst after relatively short periods of use. This can lead to inefficient syngas production as well as increased costs associated with its production.

A discovery has been made that avoids problems associated with deactivation and mechanical degradation of dry methane reforming catalysts. The discovery is based on the use of catalyst that has a core-shell structure. The core includes a chemically inert or substantially inert material (e.g., metal oxide core, a clay core, or a zeolite core, or any combination thereof). The shell surrounds the core and has a redox-metal oxide phase that includes a metal dopant incorporated into the lattice framework of the redox-metal oxide phase. An active/catalytic metal is deposited on the surface of the shell. Without wishing to be bound by theory, it is believed that the catalyst having such a core-shell structure as described throughout the specification can oxidize carbon formed due to methane decomposition and carbon monoxide disproportion. Such a catalyst has a minimal loss of catalytic activity over more than 300 hours of usage. Further, the catalysts of the present invention have increased mechanical strength and decreased costs during the preparation process when compared with currently available dry reforming of methane-based catalysts. Still further, and in some particular instances wherein the core material is an alkaline aluminate core (e.g., magnesium aluminate (MgAl$_2$O$_4$)), it is believed that such a core has a high affinity towards CO$_2$, thereby adsorbs more carbon dioxide and helping to oxidize carbon formed on the catalysts to further reduce the incidence of coking and sintering.

These and other non-limiting aspects of the present invention are discussed in further detail in the following sections.

A. Catalyst Structure

Figure 1:
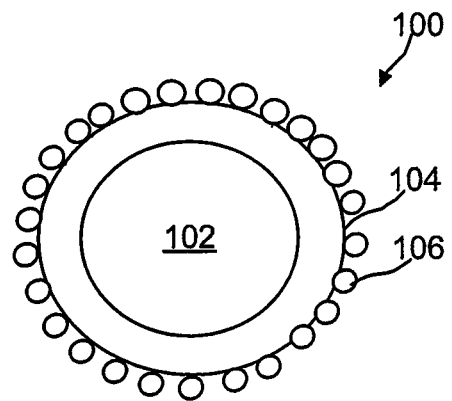
FIG. 1 depicts a schematic of the catalyst core-shell structure.

FIG. 1 is a schematic of a core-shell structure of a catalyst of the present invention. Catalyst 100 includes a core 102, a shell 104, and an active metal 106. The core 102 can be a substantially chemically inert material described throughout the specification. Core 102 can provide mechanical strength to the shell 104. Shell 104 can be a material (e.g., a metal oxide) that is capable of undergoing shifts in electronic states (e.g., reduction and oxidation states (Redox). Such materials are described throughout the specification. The shell 104 is formed on the core. In a preferred embodiment, the shell 104 substantially or completely surrounds the core. In some aspects, shell 104 is attached to the outer surface of the core 102. One or more dopants (not shown) described throughout the specification can be included in the crystal lattice of the shell 104. Active metals 106 described throughout the specification can be deposited on top of the shell 104 layer. Active metals 106 are catalytically active during the dry reformation of methane reaction process. The core-shell structure of catalyst 100 can provide an economical, mechanical strong, and highly efficient catalyst during a dry reformation of methane reaction. The catalyst 100 can be in any form or shape. In a preferred embodiment, the catalyst is in particulate form. The particulates can have a mean particle size of 100 to 1000 µm, preferably, 200 to 800 µm, or more preferably from 250 to 550 µm, or from 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, or 1000 µm or any value or range there between. Surface area can be measured using Brunauer, Emmett, and Teller (BET) method. In some embodiments, the catalyst is supported by a substrate. Non-limiting examples of a substrate include glass, a polymer bead or metal oxide. The metal oxide can be the same or a different metal oxide as the core material or the shell material.

1. Core

Core 102 can be a metal oxide, a clay, a zeolite, or any combination thereof. The core 102 can be a porous material, a chemically inert material, or both. Non-limiting examples of metal oxides include refractory oxides, alpha, beta or theta alumina ($Al_2O_3$), activated $Al_2O_3$, alkaline earth metal aluminate, silicon dioxide ($SiO_2$), titanium dioxide ($TiO_2$), magnesium oxide (MgO), calcium oxide (CaO), strontium oxide (SrO), zirconium oxide ($ZrO_2$), zinc oxide (ZnO), lithium aluminum oxide ($LiAlO_2$), magnesium aluminum oxide ($MgAl_2O_4$), manganese oxides (MnO, $MnO_2$, $Mn_2O_4$), lanthanum oxide ($La_2O_3$), silica gel, aluminosilicates, amorphous silica-alumina, magnesia, spinels, perovskites, or any combination thereof. Non-limiting examples of alkaline earth metal aluminates includes magnesium aluminate, calcium aluminate, strontium aluminate, barium aluminate, or any combination thereof, with magnesium aluminate being particularly preferred. Non-limiting examples of clays include kaolin, diatomaceous earth, activated clays, smectites, palygorskite, sepiolite, acid modified clays, thermally-modified clays, chemically treated clays (e.g., ion-exchanged clays), or any combination thereof. Examples of zeolites include Y-zeolites, beta zeolites, mordenite zeolites, ZSM-5 zeolites, and ferrierite zeolites. All of the materials used to make the supported catalysts of the present invention can be purchased or made by processes known to those of ordinary skill in the art (e.g., precipitation/co-precipitation, sol-gel, templates/surface derivatized metal oxides synthesis, solid-state synthesis, of mixed metal oxides, microemulsion technique, solvothermal, sonochemical, combustion synthesis, etc.). Non-limiting examples of commercial manufacturers of core materials include Zeolyst (U.S.A.), Alfa Aesar® (USA) CRI/Criterion Catalysts and Technologies LP (U.S.A.), and Sigma-Aldrich® (U.S.A.), BASF (Germany), and UNIVAR® (U.S.A.). The core materials can be any shape or form. Non-limiting examples of shapes and forms include a spherical shape, a cylindrical shape (e.g., extrudates, pellets), a hollow cylindrical shape, a pellet shape, or is shaped to have 2-lobes, 3-lobes, or 4 lobes, or is a monolith. The core material can be cylindrical particles having a diameter of about 0.10 to 0.5 centimeters (cm), 0.15 to 0.40 cm, or 0.2 to 0.3 cm in diameter. The surface area of the core material can range from 5 to 300 $m^2/g$, 10 to 280 $m^2/g$, 20 to 270 $m^2/g$, 30 to 250 $m^2/g$, 40 to 240 $m^2/g$, 50 to 230 $m^2/g$, 60 to 220 $m^2/g$, 70 to 210 $m^2/g$, 80 to 200 $m^2/g$, 100 to 150 $m^2/g$, or any range or value there between. In a preferred embodiment, the support material is gamma-alumina extrudates having a diameter of about 0.32 cm (⅛ inch) with a BET surface area of about 230 $m^2/g$. The support material can have a Barrett-Joyner-Halenda (BJH) adsorption cumulative volume of pores between 1.7000 nm and 300.0000 nm of 0.557 $cm^3/g$ and BJH Adsorption average pore diameter (4V/A) of 6.78 nm. In some particularly preferred instances where the core includes magnesium aluminate, the core can include 5 wt. % to 60 wt. % MgO, or 10 wt. %, 15 wt. %, 20 wt. %, 25 wt. %, 30 wt. %, 35 wt. %, 40 wt. %, 45 wt. %, 50 wt. %, 55 wt. %, 60 wt. % or any range or value there between.

2. Shell

The shell 104 can be a layer that includes a metal oxide that is able to assume multiple oxidation states depending on the chemical conditions or its redox capability. The reductant and oxidant can be redox couple (e.g., $M^+/M^{2+}$). The shell 104 can have a thickness of one atomic monolayer to 100 atomic multilayers, or 5 to 80 atomic multilayers, 10 to 60 atomic multilayers, or 20 to 5 atomic multilayers, or 1, 5, 10, 15, 20, 25, 30, 35, 40, 45, 50, 55, 60, 65, 70, 75, 80, 85, 90 or 100 atomic multilayers or any range or value there between. Non-limiting examples of metal oxides that can have a redox-metal oxide phase (e.g., redox couple) include cerium (Ce) oxide, an iron (Fe) oxide, a titanium (Ti) dioxide, a manganese (Mn) oxide, a niobium (Nb) oxide, a tungsten (W) oxide, or a zirconium (Zr) oxide, preferably a cerium oxide. Such metal oxides can form a cerium oxide phase, an iron oxide phase, a titanium dioxide phase, a manganese oxide phase, a niobium oxide phase, a tungsten oxide phase, or a zirconium oxide phase under certain chemical conditions (e.g., heat). The amount of redox-metal oxide can range from 5 to 50 wt. %, 7 to 20 wt. %, 9 to 15 wt. %, or 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight based on the total weight of catalyst. The metal oxide phase (or metal oxide layer) can include one or more metal dopants. The metal dopant can be incorporated into the crystal lattice of the metal oxide. A dopant can provide mechanical strength to the metal oxide lattice, decrease the amount of energy required to remove an oxygen anion from the metal oxide crystal lattice, or both. Non-limiting examples of metal dopants include indium (In), gallium (Ga), niobium (Nb), lanthanum (La), germanium (Ge), arsenic (As), selenium (Se), tin (Sn), antimony (Sb), tellurium (Te), thallium (Tl), or lead (Pb), or any combination thereof, preferably indium. The amount of redox-metal oxide can range from 0.1 to 5 wt. %, 0.75 to 4 wt. %, 1 to 3 wt. %, or 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%. 4.1%, 4.2%, 4.3%, 4.4%, 4.5%, 4.6%, 4.7%, 4.8%, 4.9% or 5.0% by weight based on the total weight of catalyst. The metal oxides and metal dopants can be purchased from commercial manufactures such as Sigma-Aldrich®.

The redox-metal oxide phase can change oxidation states. Therefore, the oxygen anions bonded to the crystal lattice can be released and other oxygen compounds (e.g., molecular oxygen, superoxides, and ozone) can be absorbed, thereby the oxygen in the shell 104 has mobility. Due to the redox capability of the metal oxide, the shell 104 can have a greater oxygen mobility than the core 102. The mobility of the oxygen in the shell and/or core can be determined using theoretical calculations as shown in the Example section. Without wishing to be bound by theory, it is believed that when the redox-metal oxide phase is reduced, the metal-oxygen bond is weakened and oxygen atoms can be abstracted (moves) to create an oxygen vacancy as shown in Scheme I. In Scheme I, CO is abstracting an oxygen anion from the metal oxide lattice to form $CO_2$ and oxygen vacancy (depicted as a rectangle). Due to the structure of the metal redox phase, the removal of the oxygen anion can occur without disrupting or destroying the crystal lattice of the metal oxide.

Scheme I

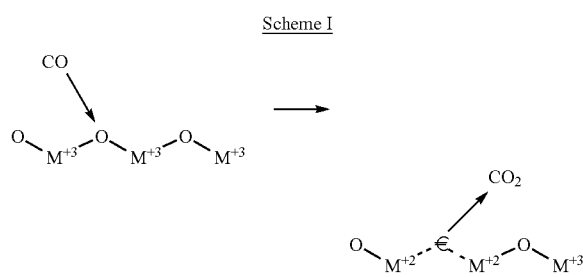

Figure 2A:
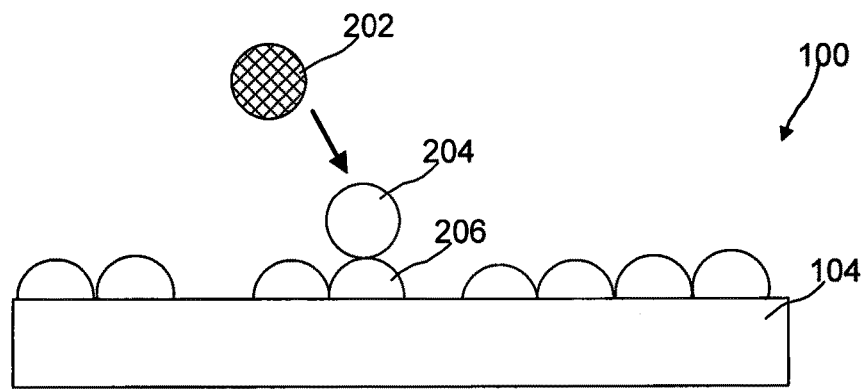
FIGS. 2A-2C depict a reaction schematic of oxidation of carbon residuals by the catalyst of the present invention.
Figure 2B:
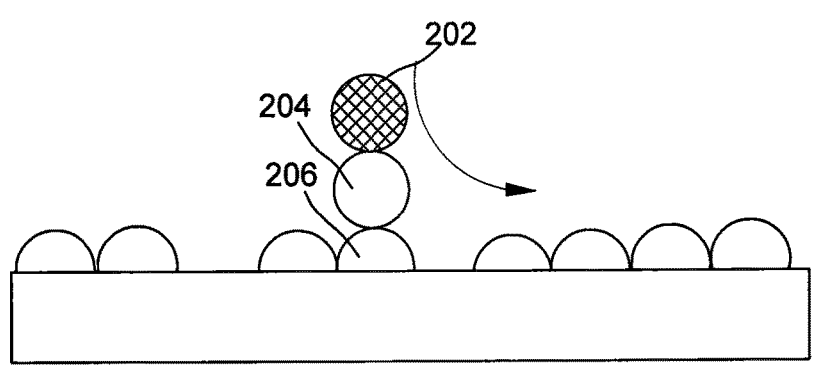
Figure 2C:
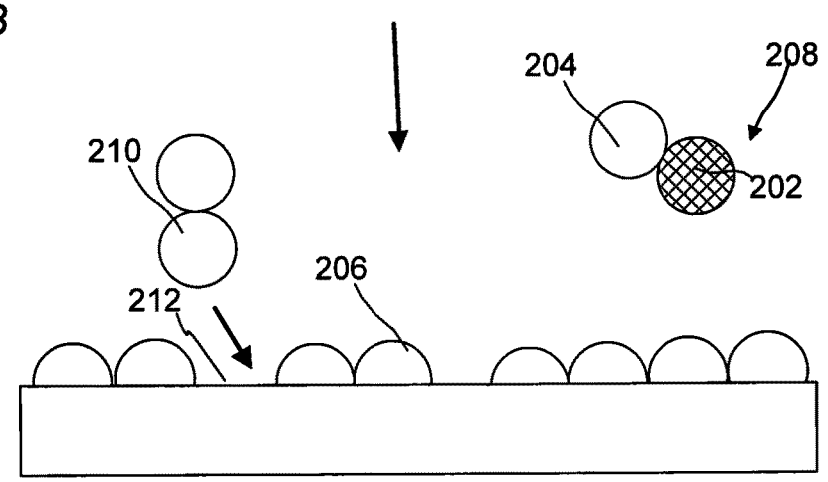

As more oxygen atoms are abstracted, the concentration of vacancies (□) can increase, thereby leaving behind two electrons to be shared between the metal atoms (shown as dotted line in Scheme I). The oxygen atoms can be abstracted from any surface or subsurface of the metal oxide. In a similar manner, the metal can absorb molecular oxygen ($O_2$) into the vacancy which oxidizes some of the metals due to the increase in available electrons. Without wishing to be bound by theory, it is believed that the ability of the shell to store and release oxygen anions through this redox process assists in oxidizing carbon deposited on the surface of the catalyst to a carbon monoxide. For example, the carbon atom can deposit on the absorbed oxygen on the surface of the metal oxide and be released as carbon monoxide as shown in FIG. 2. FIG. 2 is a schematic of the oxidation of carbon by contact with the redox-metal oxide phase of the catalyst 100. In FIG. 2, for simplicity, the active metal 106 and the core 102 are not depicted. Referring to FIG. 2A, a carbon atom 202 is attracted to oxygen atom 204 that is bound to oxygen atom 206 of metal-redox phase of shell 104. As shown in FIG. 2B, the carbon atom 202 bonds to the oxygen atom 206 to form carbon monoxide 208. In FIG. 2C, carbon monoxide 208 can diffuse from shell 104 and molecular oxygen 210 can be absorbed into a vacancy 212 to continue the oxidation of carbon residual process.

3. Active Metals

Catalyst 100 can include one or more active (catalytic) metals to promote the reforming of methane to carbon dioxide. The active metals 106 can be attached to the surface of the shell 104 (See, FIG. 1). The active metal(s) 106 can include one or more metals from Columns 7-11 of the Periodic Table (Groups VIIB, VIII, and IB). Non-limiting examples of the active metals include nickel (Ni), rhodium (Rh), ruthenium (Re), iridium (Ir), platinum (Pt), palladium (Pd), gold (Au), silver (Ag), cobalt (Co), manganese (Mn), copper (Cu), or any combination thereof, preferably nickel, rhodium, ruthenium, or platinum. The amount of active metal on the shell 104 depends, inter alia, on the catalytic (metal) activity of the catalyst. In some embodiments, the amount of catalyst present on the shell ranges from 1 to 40 wt. %, 2 to 15 wt. %, 5 to 12 wt. %, or 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40% by weight based on the total weight of catalyst. In some instances, the active metal can be a binary alloy (M1M2) or a tertiary alloy (M1M2M3), where M1 is nickel (Ni), and M2 and M3 are each rhodium (Rh), ruthenium (Ru), iridium (Ir), platinum (Pt), palladium (Pd), gold (Au), silver (Ag), cobalt (Co), manganese (Mn), copper (Cu), zinc (Zn), iron (Fe), molybdenum (Mo), or zirconium (Zr). In a particular instance, the active metal can be binary alloy (M1M2) where M1 is nickel and M2 is rhodium (Rh) or platinum (Pt) (e.g., NiRh, or NiPt).

B. Preparation of Core-Shell Catalysts

The catalyst of the present invention can be made by processes that provide for a core-shell structure. As further illustrated in the Examples, the catalyst can be made using known catalyst preparation methods (e.g., impregnation or spraying methods). In a non-limiting example, a first metal salt (e.g., redox-metal salt) and a second metal salt (e.g., salt of the metal dopant) can be solubilized in a solution (e.g., water). Examples of the first metal salt includes nitrates, ammonium nitrates, carbonates, oxides, hydroxides, halides of Ce, Fe, Ti, Mn, Nb, W, or Zr. Examples of the second metal salt include nitrates, ammonium nitrates, carbonates, oxides, hydroxides, halides of Column 7-12 metals. In a particular embodiment, $NbCl_5$, or $InCl_3.4H_2O$, and $(NH_4)_2Ce(NO_3)_6$, can be solubilized in deionized water. The weight ratio of the first metal salt to the second metal salt present in the solution can be at least 5:1, 5:1 to 30:1, 7:1 to 20:1, 10:1 to 15:1, or 5, 6, 7, 8, 9, 10, 11, 12, 13, 14, 15, 16, 17, 18, 19, 20, 21, 22, 23, 24, 25, 26, 27, 28, 29, 30 to 1 or any range or value there between. In some embodiments, the second metal salt (metal dopant is not used). The solution can be impregnated with the core material (e.g., a metal oxide core, a clay core, or a zeolite core). In a particular embodiment, the solution is impregnated with gamma-alumina extrudates. The impregnated material can be dried an average temperature of 50 to 150° C., 75 to 100° C., 80 to 90° C., or 50, 55, 60, 65, 70, 75, 80, 85, 90, 95, 100, 105, 110, 115, 120, 125, 130, 135, 140, 145, or 150° C. for 2, 3, 4, 5, 6, 7, 8, 9, 10 hours or until the impregnated material is deemed to be dry. The dried impregnated material can be calcined (converted to the metal oxide) at an average temperature of 500 to 800° C., 600 to 700° C., or 500, 525, 550, 575, 600, 625, 650, 675, 700, 725, 750, 775, or 800° C. at 2, 3, 4 hours or until the impregnated material is deemed to be sufficiently calcined to obtain a core-shell structure where the shell surrounds the core (e.g., core 102 and shell 104 of FIG. 1) and the shell has a redox-metal oxide phase formed from the first metal salt and metal dopant formed from the second metal salt incorporated into the lattice framework of the redox-metal oxide phase. This process can be repeated to obtain a shell having a desired amount of dopants to tune the oxygen mobility of the catalytic material.

In some embodiments, the solutions can be impregnated with the core material in a stepwise manner. For example, the redox metal-salt can be pore volume impregnated with the core material, dried and calcined and, then dopant metal can be pore volume impregnated with the core material, dried and calcined to form the core-shell material. This process can be repeated to obtain a shell having a desired amount of dopants to tune the oxygen mobility of the catalytic material. Incorporation of the dopant in the redox metal oxide (e.g., $CeO_2$) phase can be determined using X-ray diffraction methods. By way of example, a catalyst containing $CeO_2$ and dopant will show a slight shifting in diffraction patterns related to $CeO_2$ due to the incorporation of dopant. Some of dopant can be dispersed in the core, however, a majority of the dopant remains in shell and disperses homogeneously in shell during calcination.

One or more active metals can be deposited on the surface of the shell using known metal deposition methods (e.g., impregnations, spraying, chemical vapor depositing, etc.). In a non-limiting example, the core-shell structure can be slowly impregnated with an aqueous solution of active metal. For example, the active metal solution can be added dropwise to the metal oxide extrudates which were under constant mechanical stirring. The impregnated material can be dried an average temperature of 50 to 120° C., 75 to 110° C., 80 to 90° C., or 50, 55, 60, 65, 70, 75, 80, 85, 90, 95, 100, 105, 110, 115, or 120° C. for 0.5, 1, or 2 hours or until the impregnated material is deemed to be dry. The dried impregnated core-shell material can be calcined (converted to the metal oxide) at an average temperature of 500 to 850° C., 600 to 800° C., or 500, 525, 550, 575, 600, 625, 650, 675, 700, 725, 750, 775, 800, 825, or 850° C. at 0.5, 1, or 2 hours or until the impregnated material is deemed to be sufficiently calcined to obtain the catalyst having a core-shell structure with active metal deposited on the surface of the shell (e.g., catalyst 100 in FIG. 1). The resulting core-shell catalyst can be crushed and sieved to a desired size, e.g., 300 to 500 μm.

As illustrated in the Examples section, the produced core-shell catalysts of the invention are sinter and coke resistant materials at elevated temperatures, such as those typically used in syngas production or dry methane reformation reactions (e.g., 700° C. to 950° C. or a range from 725° C., 750° C., 775° C., 800° C., 900° C., to 950° C.). Further, the produced catalysts can be used effectively in carbon dioxide reforming of methane reactions at a temperature range from 700° C. to 950° C. or from 800° C. to 900° C., a pressure range of 1 bara, and/or at a gas hourly space velocity (GHSV) range from 500 to 10000 $h^{-1}$, preferably a temperature of 800° C., a pressure of 1 bara, and a GHSV of 75,000 $h^{-1}$.

C. Carbon Dioxide Reforming of Methane

Also disclosed is a method of producing hydrogen and carbon monoxide from methane and carbon dioxide. The method includes contacting a reactant gas mixture of a hydrocarbon and oxidant with any one of the bulk metal oxide catalysts and/or supported metal oxide catalysts discussed above and/or throughout this specification under sufficient conditions to produce hydrogen and carbon monoxide with a methane conversion of at least 50%, 60%, 70% 80% or more. Such conditions sufficient to produce the gaseous mixture can include a temperature range of 700° C. to 950° C. or a range from 725° C., 750° C., 775° C., 800° C., to 900° C., or from 700° C. to 950° C. or from 750° C. to 900° C., a pressure range of about 1 bara, and/or a gas hourly space velocity (GHSV) ranging from 500 to 100,000 $h^{-1}$ or a range from 500 $h^{-1}$, 1000 $h^{-1}$, 5000 $h^{-1}$, 10,000 $h^{-1}$, 20,000 $h^{-1}$, 30,000 $h^{-1}$, 40,000 $h^{-1}$, 50,000 $h^{-1}$, 60,000 $h^{-1}$, 70,000 $h^{-1}$, 80,000 $h^{-1}$, 90,000 $h^{-1}$, to 100,000 $h^{-1}$. In a particular instance, an average temperature from 750 to 800° C., a pressure of 1 bara, and a GHSV of 70,000 to 75,000 $h^{-1}$ is used. Under such conditions the methane conversion is 60 to 80%, preferably 65 to 75%, after 300 hours on the stream. The $H_2/CO$ ratio can be at least 0.5, or 0.5, 0.55, 0.6, 0.65, 0.7, 0.75, 0.8, or more. In particular instances, the hydrocarbon includes methane and the oxidant is carbon dioxide. In other aspects, the oxidant is a mixture of carbon dioxide and oxygen. In certain aspects, the carbon residual formation or coking is reduced or does not occur on the core-shell structured catalyst and/or sintering is reduced or does not occur on the core-shell structured catalyst. In particular instances, carbon residuals formation or coking and/or sintering is reduced or does not occur when the core-shell structured catalyst is subjected to temperatures at a range of greater than 700° C. or 800° C. or a range from 725° C., 750° C., 775° C., 800° C., 900° C., to 950° C. In particular instances, the range can be from 700° C. to 950° C. or from 750° C. to 900° C. at a pressure of 1 bara. Without wishing to be bound by theory it is believed that no or substantially little sintering occurs because the oxygen mobility is enhanced in the lattice of the catalyst, thus oxidizing coke from hydrocarbon decomposition, thereby, making the active sites available for a longer period of time.

In instances when the produced catalytic material is used in dry reforming methane reactions, the carbon dioxide in the gaseous feed mixture can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as starting material in the process of the invention is that it can reduce the amount of carbon dioxide emitted to the atmosphere (e.g., from a chemical production site). The hydrogen in the feed may also originate from various sources, including streams coming from other chemical processes, like ethane cracking, methanol synthesis, or conversion of methane to aromatics. The gaseous feed mixture comprising carbon dioxide and hydrogen used in the process of the invention may further contain other gases, provided that these do not negatively affect the reaction. Examples of such other gases include oxygen and nitrogen. The gaseous feed mixture has is substantially devoid of water or steam. In a particular aspect of the invention the gaseous feed contains 0.1 wt. % or less of water, or 0.0001 wt. % to 0.1 wt. % water. The hydrocarbon material used in the reaction can be methane. The resulting syngas can then be used in additional downstream reaction schemes to create additional products. Such examples include chemical products such as methanol production, olefin synthesis (e.g., via Fischer-Tropsch reaction), aromatics production, carbonylation of methanol, carbonylation of olefins, the reduction of iron oxide in steel production, etc.

The reactant gas mixture can include natural gas or methane, liquefied petroleum gas comprising $C_2$-$C_5$ hydrocarbons, $C_6$+ heavy hydrocarbons (e.g., $C_6$ to $C_{24}$ hydrocarbons such as diesel fuel, jet fuel, gasoline, tars, kerosene, etc.), oxygenated hydrocarbons, and/or biodiesel, alcohols, or dimethyl ether. In particular instances, the reactant gas mixture has an overall oxygen to carbon atomic ratio equal to or greater than 0.9.

The method can further include isolating and/or storing the produced gaseous mixture. The method can also include separating hydrogen from the produced gaseous mixture (such as by passing the produced gaseous mixture through a hydrogen selective membrane to produce a hydrogen permeate). The method can include separating carbon monoxide from the produced gaseous mixture (such as passing the produced gaseous mixture through a carbon monoxide selective membrane to produce a carbon monoxide permeate).

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of Catalysts with $Al_2O_3$ Core Material

Materials: Metal precursor salts for the core-shell structured catalysts of the present invention were obtained from Sigma Aldrich Chemical Company (St. Louis, Mo., USA) and used as received. Core material (γ-$Al_2O_3$ ⅛" pellets) was obtained from Alfa Aesar, Stock#43832. The BET surface area of γ-$Al_2O_3$ was measured and found to be 231 $m^2/g$.

General Procedure: A procedure for preparation of one of the core-shell catalysts of the present invention is described. The core-shell catalysts listed in Table 1 were prepared using similar protocols. Table 1 lists the redox-metal oxides, metal dopants, and active metal and the amount of each in the catalyst.

Step 1: cerium ammonium nitrate (2.86 g) and indium chloride (0.19 g) were dissolved in deionized water (7.2 ml). The resultant solution was impregnated with gamma-$Al_2O_3$ extrudates (6.0 g). The resulting impregnated material was dried at 80° C. in an oven under the flow of air. Drying was continued at 120° C. for 2 h followed by calcination at 550° C. for 3 h to obtain a core-shell material. The resultant material possessed a yellowish color.

Step 2: nickel chloride hexahydrate (0.98 g) and rhodium chloride (0.2 g) were dissolved in deionized water (3.6 ml). The resultant solution was slowly impregnated with the material obtained in Step 1. The material was dried at 120° C. for 2 h and calcined at 850° C. for 4 h to obtain a core-shell catalyst of the present invention.

Figure 4:
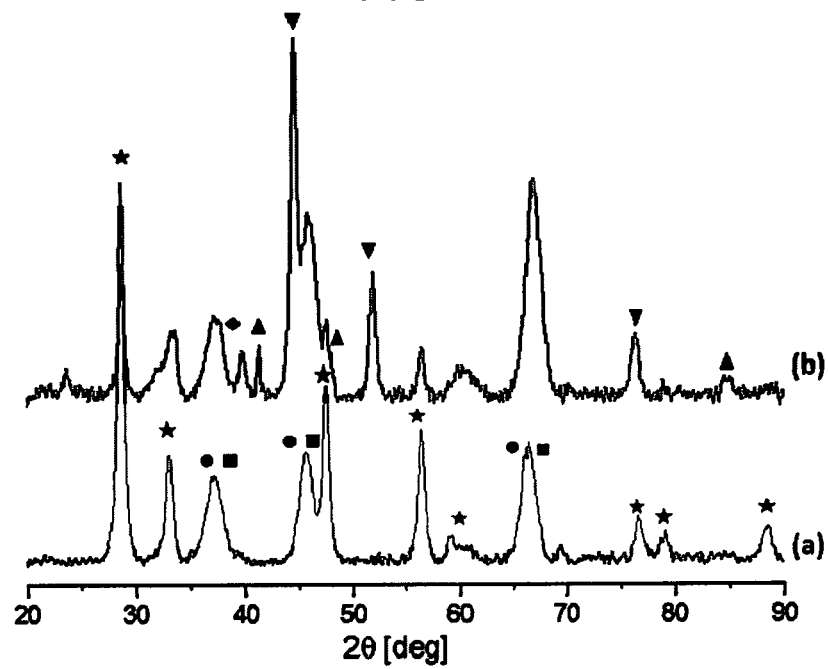
FIG. 4 shows the XRD pattern of the NiRh/Nb—CeO$_2$ metal doped Al$_2$O$_3$ core-shell catalyst of the present invention before and after reduction.

NiRh/In—$CeO_2$ catalyst, pattern (b) is NiRh/Nb—$CeO_2$ catalyst, pattern (c) is NiRh/Ga—$CeO_2$ catalyst, pattern (d) is NiRh/La—$CeO_2$ catalyst, and pattern (e) is NiRh/$CeO_2$ catalyst. The phases corresponding to $CeO_2$ (Star): ICDD=00-043-1002, $Al_2O_3$ (Square): ICDD=01-073-6579 and NiO (circle): 01-089-8397 were noticeable. Since the XRD patterns were similar in nature, the synthesis of the core-shell catalyst was determined to be reproducible. The broaden peak width at half height of the peaks at 37°, 46° and 67° is due to overlapping of the $Al_2O_3$ and NiO diffraction peaks, and not by the small size of the crystallites. The weight percentage of Rh (2.5 wt %) and dopant (1.43 wt %) are below the detection limit of the XRD spectrometer. These peaks also do not appear due to the overlapping of the different XRD patterns and amorphous nature of the sample. FIG. 4 shows the XRD pattern of the NiRh/Nb—$CeO_2$ core-shell catalyst of the present invention before and after reduction. The catalyst was reduced in a separate plug flow reactor at 800° C. in presences for 10 vol. % $H_2$/Ar atmosphere for 4 hours. Oxidized NiRh/Nb—$CeO_2$ is depicted by pattern (a) and reduced NiRh/Nb—$CeO_2$ is depicted by pattern (b). Phases corresponding to $CeO_2$ (Star): ICDD=01-081-0792, $Al_2O_3$ (Square): ICDD=01-077-0396 and NiO (circle): 01-089-8397, Ni (triangle-up): ICDD: 03-065-2865, Rh (triangle-down): ICDD=00-005-0685 and Nb hydride (diamond): ICDD=01-073-2592 were noticeable. From FIG. 4, it was determined that after reduction, the $CeO_2$ and $Al_2O_3$ remained unaltered. NiO and $RhO_2$ were reduced to metallic Ni and Rh respectively. The formation of the Nb hydride form was unexpected. These results support the assumption of the $Al_2O_3$ and NiO peaks overlapping in the XRD pattern in of the unreduced sample.

TABLE 1

| Catalyst Code | Composition |
| --- | --- |
| Ni/Nb—$CeO_2$ | 12.8 wt % $CeO_2$, 1.43 wt % $NbO_2$, 7.5% Ni, 78.27 wt % $Al_2O_3$ |
| Ni/Bi—$CeO_2$ | 12.8 wt % $CeO_2$, 1.43 wt % $BiO_2$, 7.5% Ni, 78.27 wt % $Al_2O_3$ |
| Ni/Ga—$CeO_2$ | 12.8 wt % $CeO_2$, 1.43 wt % $GaO_2$, 7.5% Ni, 78.27 wt % $Al_2O_3$ |
| Ni/La—$CeO_2$ | 12.8 wt % $CeO_2$, 1.43 wt % $La_2O_3$, 7.5% Ni, 78.27 wt % $Al_2O_3$ |
| Ni/In—$CeO_2$ | 12.8 wt % $CeO_2$, 1.43 wt % $InO_2$, 7.5% Ni, 78.27 wt % $Al_2O_3$ |
| Ni/In—$CeO_2$ | 12.8 wt % $CeO_2$, 0.5 wt % $InO_2$, 7.5% Ni, 78.27 wt % $Al_2O_3$ |
| Ni/$CeO_2$ | 12.8 wt % $CeO_2$, 7.5% Ni, 85.77 wt % $Al_2O_3$ |
| NiRh/Nb—$CeO_2$ | 12.8 wt % $CeO_2$, 1.43 wt % $NbO_2$, 2.5 wt % Rh, 7.5% Ni, 75.77 wt % $Al_2O_3$ |
| NiRh/Bi—$CeO_2$ | 12.8 wt % $CeO_2$, 1.43 wt % $BiO_2$, 2.5 wt % Rh, 7.5% Ni, 75.77 wt % $Al_2O_3$ |
| NiRh/Ga—$CeO_2$ | 12.8 wt % $CeO_2$, 1.43 wt % $GaO_2$, 2.5 wt % Rh, 7.5% Ni, 75.77 wt % $Al_2O_3$ |
| NiRh/La—$CeO_2$ | 12.8 wt % $CeO_2$, 1.43 wt % $La_2O_3$, 2.5 wt % Rh, 7.5% Ni, 75.77 wt % $Al_2O_3$ |
| NiRh/In—$CeO_2$ | 12.8 wt % $CeO_2$, 1.43 wt % $InO_2$, 2.5 wt % Rh, 7.5% Ni, 75.77 wt % $Al_2O_3$ |
| NiRh/$CeO_2$ | 12.8 wt % $CeO_2$, 2.5 wt % Rh, 7.5% Ni, 77.2 wt % $Al_2O_3$ |
| NiPt/Nb—$CeO_2$ | 12.8 wt % $CeO_2$, 1.43 wt % $NbO_2$, 2.5 wt % Pt, 7.5% Ni, 75.77 wt % $Al_2O_3$ |
| NiPt/Bi—$CeO_2$ | 12.8 wt % $CeO_2$, 1.43 wt % $BiO_2$, 2.5 wt % Pt, 7.5% Ni, 75.77 wt % $Al_2O_3$ |
| NiPt/Ga—$CeO_2$ | 12.8 wt % $CeO_2$, 1.43 wt % $GaO_2$, 2.5 wt % Pt, 7.5% Ni, 75.77 wt % $Al_2O_3$ |
| NiPt/La—$CeO_2$ | 12.8 wt % $CeO_2$, 1.43 wt % $La_2O_3$, 2.5 wt % Pt, 7.5% Ni, 75.77 wt % $Al_2O_3$ |
| NiPt/In—$CeO_2$ | 12.8 wt % $CeO_2$, 1.43 wt % $InO_2$, 2.5 wt % Pt, 7.5% Ni, 75.77 wt % $Al_2O_3$ |
| NiPt/$CeO_2$ | 12.8 wt % $CeO_2$, 2.5 wt % Pt, 7.5% Ni, 77.2 wt % $Al_2O_3$ |
| Ni0.1Pt/In—$CeO_2$ | 15 wt % $CeO_2$, 1.0 wt % $InO_2$, 0.1 wt % Pt, 15% Ni, 68.99 wt % $Al_2O_3$ |
| Ni15/In—$CeO_2$ | 15 wt % $CeO_2$, 15 wt % Ni, 1.0 wt % $InO_2$, 69 wt % $Al_2O_3$ |

Example 2

Characterization of Catalysts of Example 1

Figure 3:
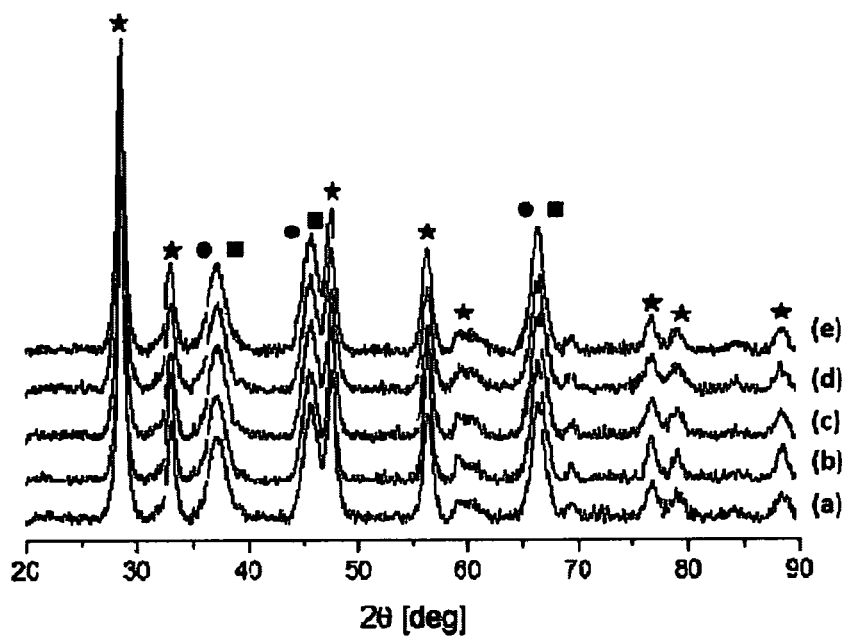
FIG. 3 are X-ray diffraction patterns for NiRh/In—CeO$_2$, NiRh/Nb—CeO$_2$, NiRh/Ga—CeO$_2$, NiRh/La—CeO$_2$, and NiRh/CeO$_2$ metal doped core-shell catalysts of the present invention with Al$_2$O$_3$ as the core material.

All samples from Example 1 were characterized by powder X-ray analysis for phase determination. FIG. 3 are X-ray diffraction patterns for NiRh/In—$CeO_2$, NiRh/Nb—$CeO_2$, NiRh/Ga—$CeO_2$, NiRh/La—$CeO_2$, and NiRh/$CeO_2$ catalysts having the compositions listed in Table 1. Pattern (a) is Example 3

Calculation of Oxygen-Vacancy Formation Energy (eV) for the Catalysts of Example 1

The oxygen-vacancy formation energy (eV) of the catalysts from Example 1 were calculated using Vienna ab initio simulation program (VASP). The calculations were carried out at the DFT-GGA+U level (Density Functional Theory (DFT)—Generalized Gradient Approximation (GGA), plus Hubbard parameter) using a metal dopant content of about 7 wt. % and the most stable $CeO_2(111)$ surface. Table 2 lists the dopant/CeO2 combination and the oxygen-vacancy formation energy (OVF) values. From the calculations, it was determined that the percentage of oxygen vacancy was equal to about 3%. It was also determined that the Ga— and In-doped $CeO_2$ systems had the lowest oxygen-vacancy formation energies. Based on these calculations, the oxygen mobility was predicted to be the easiest in the Ga— and In-doped $CeO_2$ core-shell catalysts of the present invention, which confirms the data showing that the core-shell catalysts of the present invention containing Ga and In in the framework of the redox-metal oxide phase had a higher stability towards coke formation.

TABLE 2

| Dopant/CeO₂ | OVF (eV) |
| --- | --- |
| Undoped - CeO₂ | 3.07 |
| Sn—CeO₂ | 2.24 |
| Nb—CeO₂ | 1.61 |
| La—CeO₂ | 1.35 |
| Bi—CeO₂ | 1.26 |
| In—CeO₂ | 0.69 |
| Ga—CeO₂ | 0.63 |

Example 4

Dry Reforming of Methane General Procedure for the Catalysts of Example 1

General Procedure: A high throughput reactor system provided by THE (Germany) was used. Reactors were of plug flow type and make up of steel, with inner ceramic liners. Ceramic liner with 5 mm in diameter and 60 cm in length was used to avoid coking due to methane cracking on steel surface. Core-shell catalyst pellets were crushed and sieved to a particle size of between 300-500 µm. A required amount of core-shell catalyst sieve fraction was placed on top of inert material inside the ceramic liner. A reactant mixture of carbon dioxide, methane and argon (45% $CO_2$, 45% $CH_4$, and 10% Ar) was used as feed. All the gasses had a purity of 99.999%. Argon was used as an internal standard for GC analysis. The core-shell catalyst in its oxidized state was heated to 800° C. in the presence of nitrogen and argon (90% $N_2$ and 10% Ar). The reactant mixture was dosed in 4 steps with 5 minutes intervals, which replaced equivalent amounts of nitrogen in each step. After reaching the reactant composition of 45% $CO_2$, 45% $CH_4$, 10% Ar, gas analysis was started after waiting for 1 hour. An Agilent GC 7867 was used for gas analysis. Methane and $CO_2$ conversion was calculated as follows.

$$\text{Methane conversion} = \frac{\text{mol of methane converted}}{\text{mol of methane in feed}} \times 100$$

$$\text{Carbon dioxide conversion} = \frac{\text{mol of carbon dioxide converted}}{\text{mol of carbon dioxide in feed}} \times 100$$

The ratio of hydrogen to carbon monoxide is calculated as follows, $$\text{H2/CO} = \frac{\text{mol of Hydrogen in product}}{\text{mol of carbon monoxide in product}} \times 100$$

Example 5

Dry Reforming of Methane Using Ni— Metal Doped $CeO_2$ Catalysts of Example 1

Figure 5:
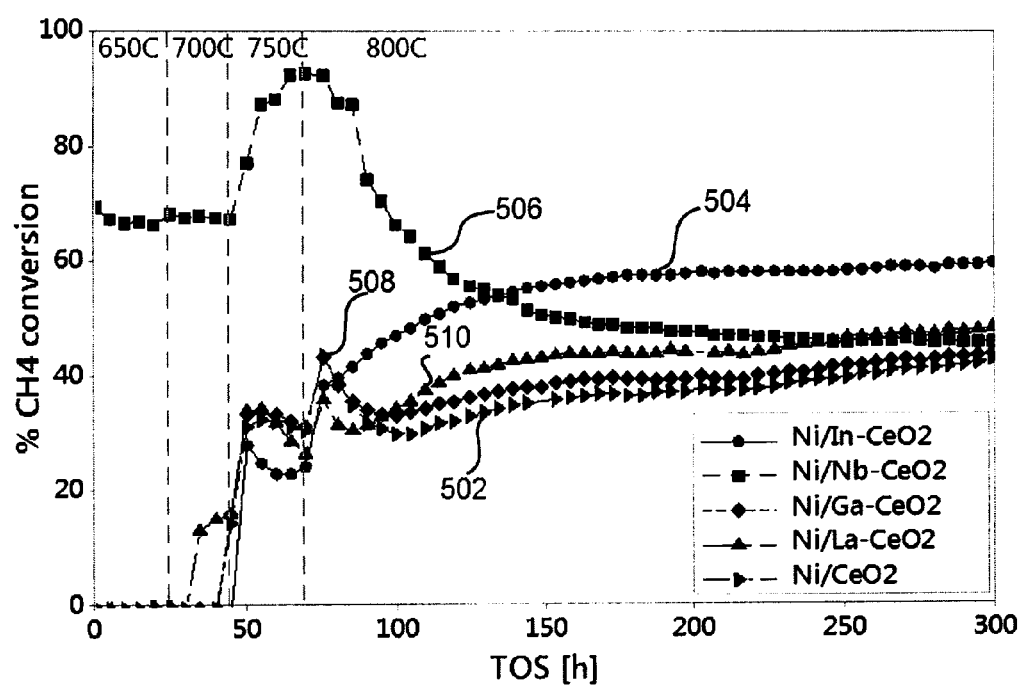
FIG. 5 shows methane (CH$_4$) conversion in percent versus time on stream in hours for dry reforming of methane using the Ni/CeO$_2$ undoped Al$_2$O$_3$ core-shell catalyst, and the Ni/In—CeO$_2$, Ni/Nb—CeO$_2$, Ni/Ga—CeO$_2$, and Ni/La—CeO$_2$ metal doped Al$_2$O$_3$ core-shell catalysts of the present invention.
Figure 6:
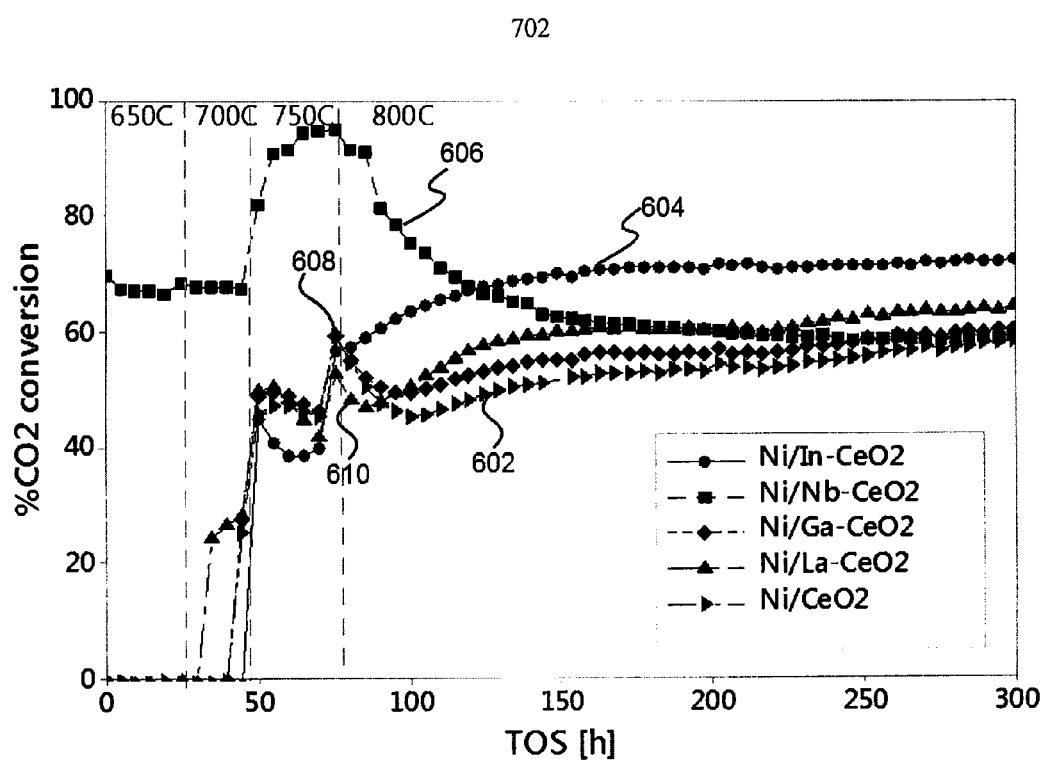
FIG. 6 shows carbon dioxide (CO$_2$) conversion in percent versus time on stream in hours for dry reforming of methane using the Ni/CeO$_2$ undoped Al$_2$O$_3$ core-shell catalyst and the Ni/In—CeO$_2$, Ni/Nb—CeO$_2$, Ni/Ga—CeO$_2$, and Ni/La—CeO$_2$ metal doped Al$_2$O$_3$ core-shell catalysts of the present invention

Using the general procedure in Example 4, methane was reformed with carbon dioxide at 800° C., 1 bara and GHSV of about 73,500 $h^{-1}$ using undoped core-shell catalyst Ni/CeO$_2$, and doped core-shell catalysts Ni/In—CeO$_2$, Ni/Nb—CeO$_2$, Ni/Ga—CeO$_2$, and Ni/La—CeO$_2$ from Example 1. FIG. 5 shows methane ($CH_4$) conversion in percent versus time on stream in hours for dry reforming of methane using undoped Ni/CeO$_2$ and doped Ni/In—CeO$_2$, Ni/Nb—CeO$_2$, Ni/Ga—CeO$_2$, and Ni/La—CeO$_2$ core-shell catalysts of the present invention. Data line 502 is undoped core-shell catalyst Ni/CeO$_2$, data line 504 is Ni/In—CeO$_2$ catalyst, data line 506 is Ni/Nb—CeO$_2$ catalyst, data line 508 is Ni/Ga—CeO$_2$ catalyst, and data line 510 is Ni/La—CeO$_2$ catalyst. FIG. 6 shows carbon dioxide ($CO_2$) conversion in percent versus time on stream in hours for dry reforming of methane using undoped Ni/CeO$_2$ and doped Ni/In—CeO$_2$, Ni/Nb—CeO$_2$, Ni/Ga—CeO$_2$, and Ni/La—CeO$_2$ core-shell catalysts of the present invention. Data line 602 is undoped Ni/CeO$_2$, data line 604 is Ni/In—CeO$_2$ catalyst, data line 606 is Ni/Nb—CeO$_2$ catalyst, data line 608 is Ni/Ga—CeO$_2$ catalyst, and data line 610 is Ni/La—CeO$_2$ catalyst. Comparing the data with the undoped Ni/CeO$_2$ catalyst, the doped catalysts showed positive impact on the activity, which, without being bound by theory, is believed to be attributed to the higher oxygen mobility in the doped CeO$_2$ and electronic effects in CeO$_2$ phase due to dopants. Of the catalysts tested, the In—Ni/CeO$_2$ catalyst showed highest activity and stability. It was observed that 800° C., Ni/In—CeO$_2$ catalyst activity increased and persistently maintained its methane conversion around 70% for a TOS of 300 h. The undoped Ni/CeO$_2$ catalyst showed the lowest activity. The Nb doped Ni/Nb—CeO$_2$ catalysts shows the extraordinary activity during first 100 h of time on stream, but lost activity after a period of time. From the data it was determined that in presence of a doped CeO$_2$ core-shell structured catalyst facilitated the reaction of the formed carbon species with the oxygen (O) atoms, thereby preventing the coke formation on the surface of the catalyst.

Example 6

Dry Reforming of Methane Using NiPt-Metal Doped $CeO_2$ Catalysts of Example 1

Figure 7:
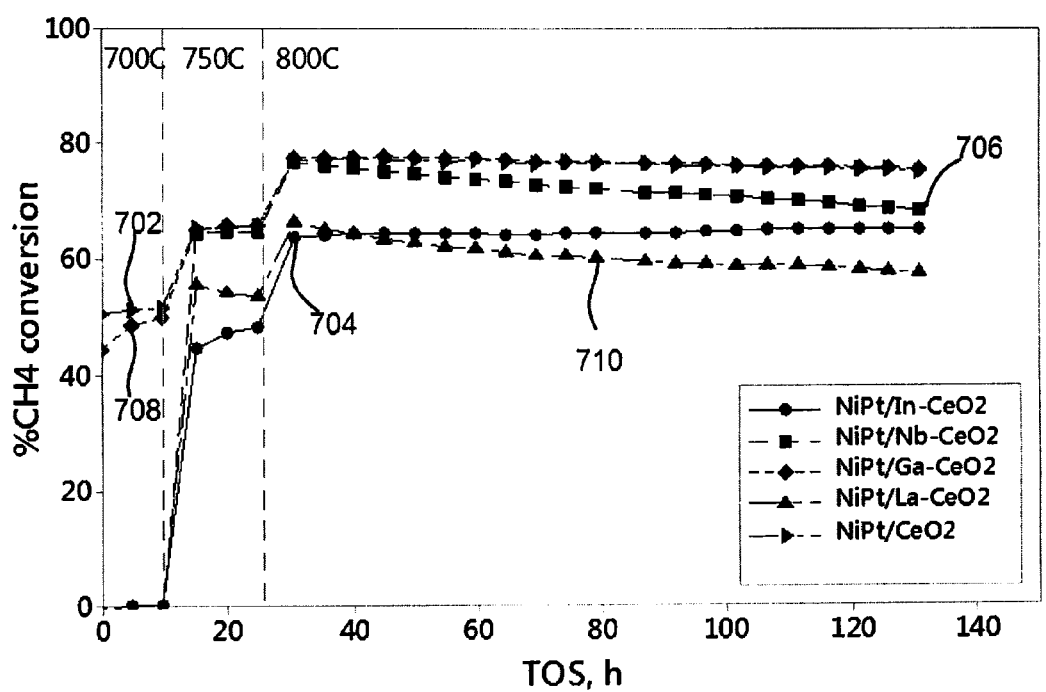
FIG. 7 shows methane (CH$_4$) conversion in percent versus time on stream in hours for dry reforming of methane using the NiPt/CeO$_2$ undoped Al$_2$O$_3$ core-shell catalyst and NiPt/In—CeO$_2$, NiPt/Nb—CeO$_2$, NiPt/Ga—CeO$_2$, and NiPt/La—CeO$_2$ the metal doped Al$_2$O$_3$ core-shell catalysts of the present invention.
Figure 8:
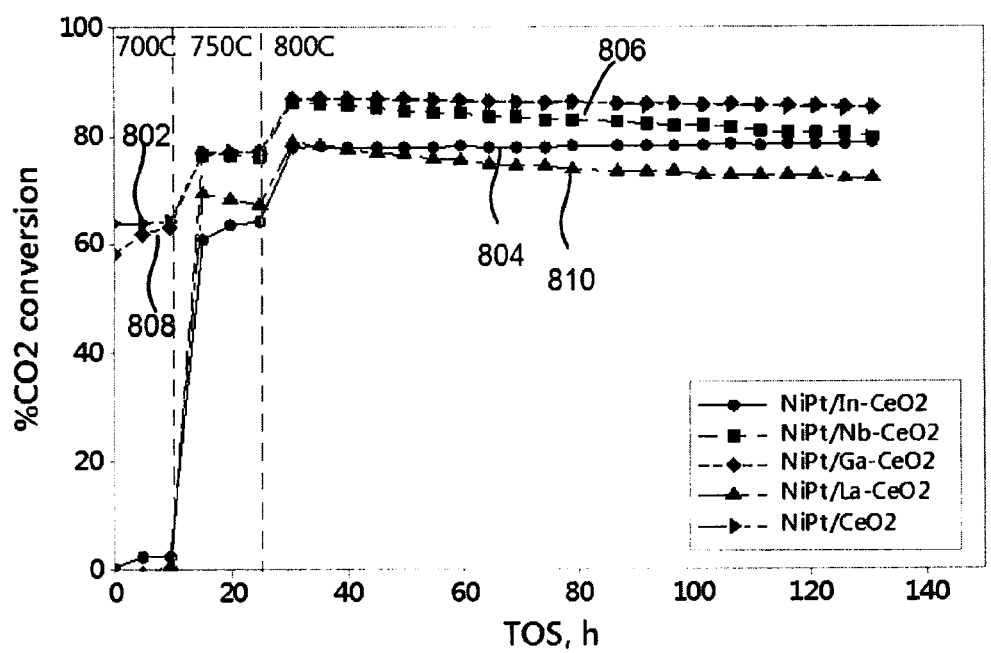
FIG. 8 shows carbon dioxide (CO$_2$) conversion in percent versus time on stream in hours for dry reforming of methane using the NiPt/CeO$_2$ undoped Al$_2$O$_3$ core-shell catalyst and the NiPt/In—CeO$_2$, NiPt/Nb—CeO$_2$, NiPt/Ga—CeO$_2$, and NiPt/La—CeO$_2$ metal doped Al$_2$O$_3$ core-shell catalysts of the present invention.

Using the general procedure in Example 4, methane was reformed at 800° C., 1 bara and GHSV of about 73,500 $h^{-1}$ using an undoped core-shell catalyst NiPt/CeO$_2$ and metal doped core-shell catalyst NiPt/In—CeO$_2$, NiPt/Nb—CeO$_2$, NiPt/Ga—CeO$_2$, and NiPt/La—CeO$_2$ from Example 1. FIG. 7 shows methane ($CH_4$) conversion in percent versus time on stream in hours for dry reforming of methane using these catalysts. Data line 702 is undoped core-shell catalyst NiPt/CeO$_2$, data line 704 is NiPt/In—CeO$_2$ catalyst, data line 706 is NiPt/Nb—CeO$_2$ catalyst, data line 708 is NiPt/Ga—CeO$_2$ catalyst, and data line 710 is NiPt/La—CeO$_2$ catalyst. FIG. 8 shows carbon dioxide ($CO_2$) conversion in percent versus time on stream in hours for dry reforming of methane using undoped core-shell catalyst NiPt/CeO$_2$ and metal doped core-shell catalysts NiPt/In—CeO$_2$, NiPt/Nb—CeO$_2$, NiPt/Ga—CeO$_2$, and NiPt/La—CeO$_2$ of the present invention. Data line 802 is undoped core-shell catalyst NiPt/CeO$_2$, data line 804 is NiPt/In—CeO$_2$ catalyst, data line 806 is NiPt/Nb—CeO$_2$ catalyst, data line 808 is NiPt/Ga—CeO$_2$ catalyst, and data line 810 is NiPt/La—CeO$_2$ catalyst. All the catalysts showed good stability over more than 300 h of operation. Comparing the activity and stability of these catalysts, the undoped core-shell catalyst, NiPt/CeO$_2$ and the metal doped core-shell catalyst NiPt/Ga—CeO$_2$ possessed the highest activity, but deactivated over time. However, the activity of NiPt/In—CeO$_2$ catalyst increased over time without any deactivation. Without wishing to be bound by theory, it is believed that incorporation of metal dopants Nb, In, La, Ga into the CeO$_2$ lattice framework created a high concentration of defects in the structure, which improved the O$_2$ mobility. This high oxygen mobility increased the oxygen vacancies in the support, which increased its reducibility, thereby favoring a continuous removal of carbon deposits from the active sites. From the data, the core-shell catalyst that included indium and the undoped core-shell catalyst having NiPt deposited on the surface of the shell showed the highest stability compared to all other candidates.

Example 7

Dry Reforming of Methane Using NiRh-Metal Doped CeO$_2$ Catalysts of Example 1

Figure 9:
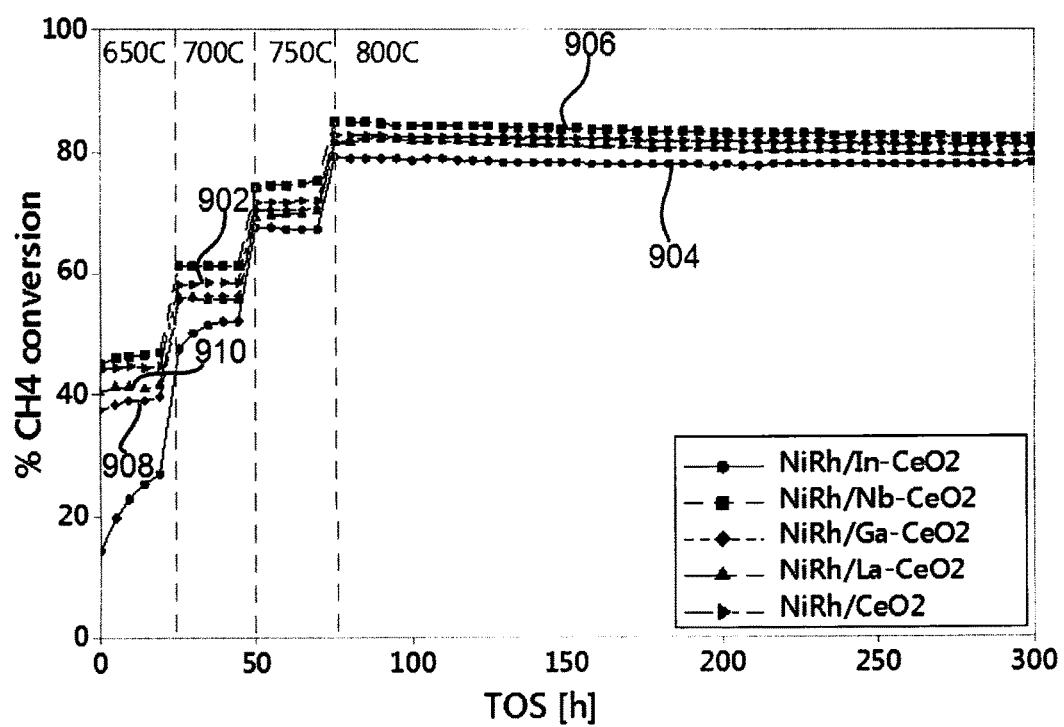
FIG. 9 shows methane (CH$_4$) conversion in percent versus time on stream in hours for dry reforming of methane using the NiRh/CeO$_2$ undoped Al$_2$O$_3$ core-shell catalyst and NiRh/In—CeO$_2$, NiRh/Nb—CeO$_2$, NiRh/Ga—CeO$_2$, and NiRh/La—CeO$_2$ metal doped Al$_2$O$_3$ core-shell catalysts of the present invention.
Figure 10:
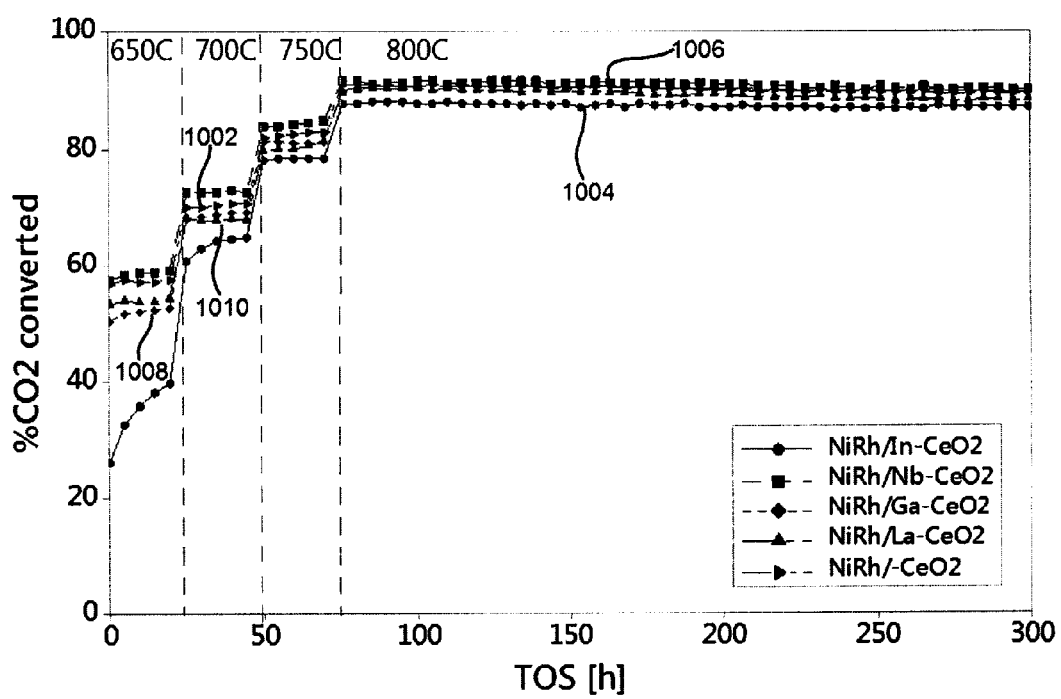
FIG. 10 shows carbon dioxide (CO$_2$) conversion in percent versus time on stream in hours for dry reforming methane of carbon dioxide using the NiRh/CeO$_2$ undoped Al$_2$O$_3$ core-shell catalyst and NiRh/In—CeO$_2$, NiRh/Nb—CeO$_2$, NiRh/Ga—CeO$_2$, and NiRh/La—CeO$_2$ metal doped Al$_2$O$_3$ core-shell catalysts of the present invention.

Using the general procedure in Example 4, methane was reformed at 800° C., 1 bara and GHSV of about 73,500 h$^{-1}$ using the undoped core-shell catalyst NiRh/CeO$_2$ and metal doped core-shell catalysts NiRh/In—CeO$_2$, NiRh/Nb—CeO$_2$, NiRh/Ga—CeO$_2$, and NiRh/La—CeO$_2$ from Example 1. FIG. 9 shows methane (CH$_4$) conversion in percent versus time on stream in hours for dry reforming of methane using these catalysts of the present invention. Data line 902 is undoped core-shell catalyst NiRh/CeO$_2$, data line 904 is NiRh/In—CeO$_2$ catalyst, data line 906 is NiRh/Nb—CeO$_2$ catalyst, data line 908 is NiRh/Ga—CeO$_2$ catalyst, and data line 910 is NiRh/La—CeO$_2$ catalyst. FIG. 10 shows carbon dioxide (CO$_2$) conversion in percent versus time on stream in hours for dry reforming of methane using these catalysts of the present invention. Data line 1002 is of undoped core-shell catalyst NiRh/CeO$_2$, data line 1004 is NiRh/In—CeO$_2$ catalyst, data line 1006 is NiRh/Nb—CeO$_2$ catalyst, data line 1008 is NiRh/Ga—CeO$_2$ catalyst, and data line 1010 is NiRh/La—CeO$_2$ catalyst. All the catalysts showed good stability over more than 300 hours of operation.

Example 8

Dry Reforming of Methane Using Ni15/In—CeO$_2$ Catalyst of Example 1

Figure 11:
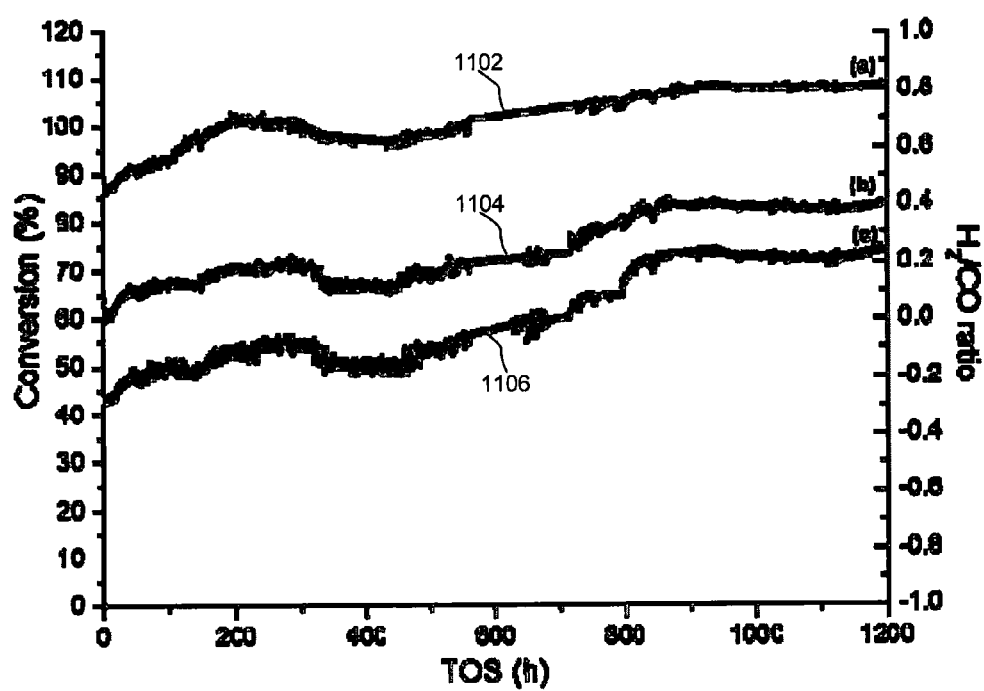
FIG. 11 shows the conversion percentage for methane and carbon dioxide and the hydrogen to carbon monoxide (H$_2$/CO) ratio for dry reforming of methane using the Ni15/In—CeO$_2$ metal doped Al$_2$O$_3$ core-shell catalyst of the present invention.

Using the general procedure in Example 4, methane was reformed at 850° C., 1 bara and GHSV of about 73,500 h$^{-1}$ using the Ni15/In—CeO$_2$ core-shell catalyst (15 wt. % Ni) from Example 1. FIG. 11 shows the conversion percentage for methane and carbon dioxide and the hydrogen to carbon monoxide ratio. Data line 1102 is the H$_2$/CO ratio, data line 1104 is the carbon dioxide conversion, and data line 1106 is the methane conversion. From the data, it was determined that the core-shell based catalyst with the composition of Ni15/In—CeO$_2$ was extremely stable. CH$_4$ conversion started at 45% and finished at 65% after 1200 h while CO$_2$ conversion increased from 60% to 80%. The H$_2$/CO ratio also increased from 0.5 to 0.8. When the 0.8 ratio was reached, it was observed that the catalyst reached steady state conditions and become stable. Without wishing to be bound by any theory, it is believed that the catalyst in presence of the different species like H$_2$O & H$_2$ and high temperature, 850° C., underwent a surface modification like a Ni/Al/Ce migration. After 1200 hours on stream, the catalyst continued to perform and neither coke nor sintering effect deactivated the catalyst. Thus, the core-shell catalyst containing an active metal (15 wt. % Ni) deposited on the surfaced of a shell that includes the metal dopant (indium) incorporated into the redox-metal oxide (CeO$_2$) framework was determined to be a robust catalyst for dry reforming of methane at 850° C. and 1 bara pressure.

Example 9

Dry Reforming of Methane General Procedure Using Ni0.1Pt/In—CeO$_2$ Catalyst of Example 1

Figure 12:
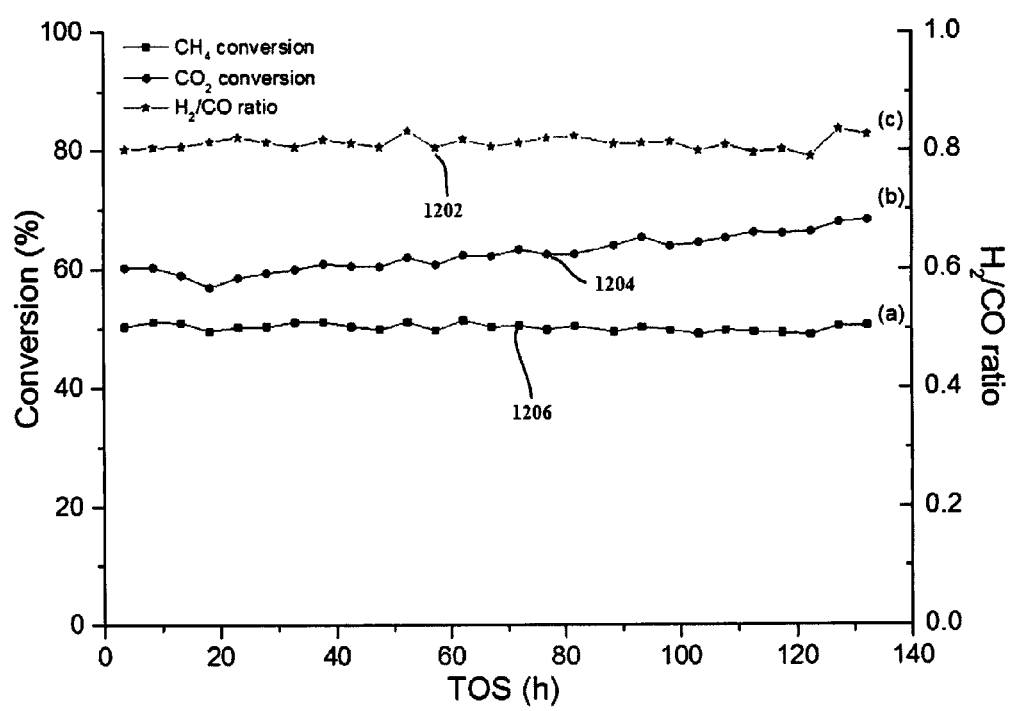
FIG. 12 shows the conversion percentage for methane and carbon dioxide and the hydrogen to carbon monoxide ratio in the dry reforming of methane reaction using the Ni0.1Pt/In—CeO$_2$ metal doped Al$_2$O$_3$ core-shell catalyst or the present invention.

Using the general procedure in Example 4, methane was reformed at 800° C., 5 bara and GHSV of about 73,500 h$^{-1}$ using the Ni0.1Pt/In—CeO$_2$ core-shell catalyst (0.1 wt. % Pt) from Example 1. FIG. 12 shows the conversion percentage for methane and carbon dioxide and the hydrogen to carbon monoxide ratio in the dry reforming of methane reaction using the Ni0.1Pt/In—CeO$_2$ core-shell catalyst or the present invention. Data line 1202 is the H$_2$/CO ratio, data line 1204 is the carbon dioxide conversion, and data line 1206 is the methane conversion. After 140 hours on stream, no deactivation behavior and no coke formation was detected. At the H$_2$/CO ratio of about 0.8, the core-shell catalyst was extremely stable.

Example 10

Dry Reforming of Methane Using Ni/In—CeO$_2$ Catalyst and Reference Catalyst of Example 1

Figure 13:
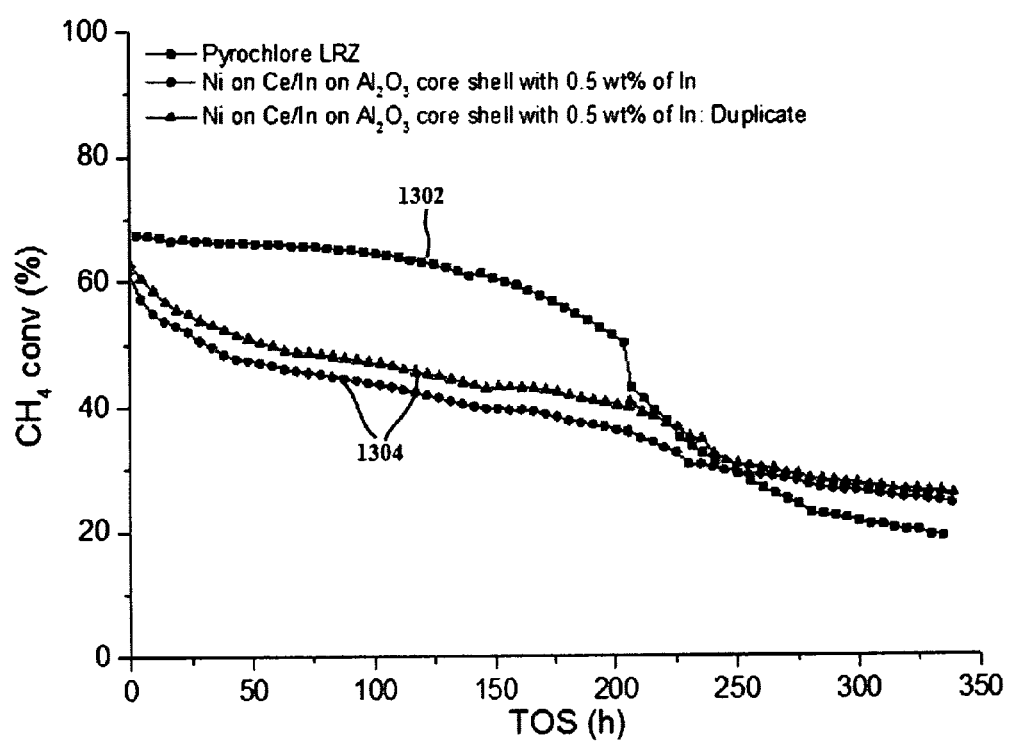
FIG. 13 shows methane (CH$_4$) conversion in percent versus time on stream in hours for dry reforming of methane using La$_2$Zr$_{0.88}$Rh$_{0.12}$O$_7$ reference catalyst and the Ni/In—CeO$_2$ metal doped Al$_2$O$_3$ core-shell catalyst of the present invention.
Figure 14:
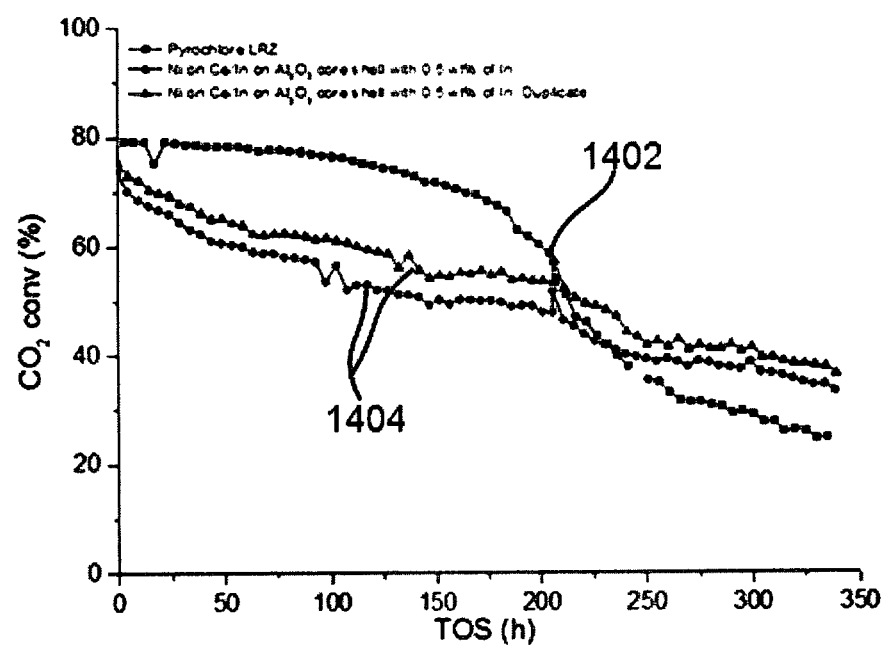
FIG. 14 shows carbon dioxide (CO$_2$) conversion in percent versus time on stream in hours for dry reforming of methane using La$_2$Zr$_{0.88}$Rh$_{0.12}$O$_7$ reference catalyst and Ni/In—CeO$_2$ Al$_2$O$_3$ core-shell catalyst of the present invention.

Using the general procedure in Example 4, methane was reformed at 800° C., 10 bara and GHSV of about 73,500 h$^{-1}$ using the Ni/In—CeO$_2$ core-shell catalyst and a known pyrochlore La$_2$Zr$_{0.88}$Rh$_{0.12}$O$_7$ reference catalyst. FIG. 13 shows methane (CH$_4$) conversion in percent versus time on stream in hours for dry reforming of methane using La$_2$Zr$_{0.88}$Rh$_{0.12}$O$_7$ reference catalyst and Ni/In—CeO$_2$ core-shell catalyst of the present invention. Data line 1302 is La$_2$Zr$_{0.88}$Rh$_{0.12}$O$_7$ reference catalyst, data lines 1304 are Ni/In—CeO$_2$ catalyst. FIG. 14 shows carbon dioxide (CO$_2$) conversion in percent versus time on stream in hours for dry reforming of methane using La$_2$Zr$_{0.88}$Rh$_{0.12}$O$_7$ reference catalyst and Ni/In—CeO$_2$ core-shell catalyst of the present invention. Data line 1402 is La$_2$Zr$_{0.88}$Rh$_{0.12}$O$_7$ reference catalyst, data lines 1404 are Ni/In—CeO$_2$ catalyst. Because the Ni/In—CeO$_2$ core-shell catalyst was extremely stable at 1 bar, this catalyst was tested at 10 bar and the reactivity/stability were compared to the known pyrochlore La$_2$Zr$_{0.88}$Rh$_{0.12}$O$_7$ which is believed to be one of the best catalyst for the dry reforming of methane reaction. As shown on the FIGS. 13 and 14, the core-shell based catalysts exhibited equivalent behavior and the results were reproducible. Overall, the core-shell based catalyst showed a constant and slow deactivation, which can be attributed to the coke formation on the surface of the catalyst. In contrast to the catalyst of the present invention, the pyrochlore catalyst decreased drastically in activity after 200 hours on stream. This rapid deactivation was attributed to the coke formation on the surface of the catalyst. Without wishing to be bound by any proof, it is believed that the Rh particles in the reference catalyst, which is responsible to the high reactivity of the catalyst were deactivated.

Example 11

Synthesis of Catalyst with Magnesium Aluminate Core Material

Metal precursor salts used for the above mentioned catalyst include, $RhCl_3$, $H_2PtCl_6$, $NiCl_3.6H_2O$, $La(NO_3)_3.6H_2O$, $NbCl_3$, $InCl_3.4H_2O$, $(NH_4)_2Ce(NO_3)_6$. All chemicals were purchased from Sigma Aldrich® (USA) and used as received. $MgAl_2O_4$ extrudates 2 mm diameter and 5 mm long and with various amount of MgO were supplied by Pacific Industrial Development Company (PIDC) (Germany). All gases used has a purity of 99.999 vol. %.

Step 1: Cerium ammonium nitrate (2.38 g) and niobium chloride (0.0872 g) were dissolved in deionized water (2.83 mL). The resultant solution was impregnated with $MgAl_2O_4$ extrudates (5.0 g). After the impregnation, the impregnated material was dried at 80° C. in an oven under the flow of air. Drying was continued at 120° C. for 2 h followed by calcination at 550° C. for 3 h. The resultant material was yellowish in color.

Step 2: Nickel chloride hexahydrate (0.911 g) was weighed and dissolved in deionized water (1.63 mL). The resultant solution was slowly impregnated with material (3 g) obtained in Step 1. The material was dried at 120° C. for 2 h and calcined at 850° C. for 4 h.

Catalysts with 1 wt % In, 1 wt % Ga, and 1 wt % La dopants were prepared by following similar protocols as explained above, with the dopant metal salt added in Step 1. Catalyst with active metals Pt or Rh were prepared by replacing rhodium chloride with chloroplatinic acid. Table 3 is a list of catalysts prepared and tested.

$Ni/Nb—CeO_2/MgAl_2O_4$ (304), $Ni/La—CeO_2/MgAl_2O_4$ (306), $Ni/In—CeO_2/MgAl_2O_4$ (308), and neat $Ni/MgAl_2O_4$ (310). The catalyst were calcined at 850° C. for 4 h before subjecting to TPR analysis. As shown, all catalysts possessed only one broad reduction peak at 850° C. The reduction temperature of bulk NiO to Ni metal happened at 220° C. The high temperature needed to reduce present catalyst indicated the strong interaction between NiO and support, resulted from high dispersion. A small reduction peak at a temperature around 450° C. was assigned to the hydrogen uptake of the surface nickel oxide that weakly interacts with the $MgAl_2O_4$ support. Referring to Profile 140 of Ni supported on $CeO_2$ catalyst, the lower temperature peak at 250° C. was attributed to the reduction of free NiO particles, while the higher temperature peaks at 400° C. and 850° C. were attributed to the reduction of strongly bound NiO on the support $CeO_2$, which was reduced to metallic ($Ni^0$) state. Profiles 100 to 130 show the absence of a reduction peak at 400° C. reflecting the absence of free NiO in these catalysts.

Figure 16:
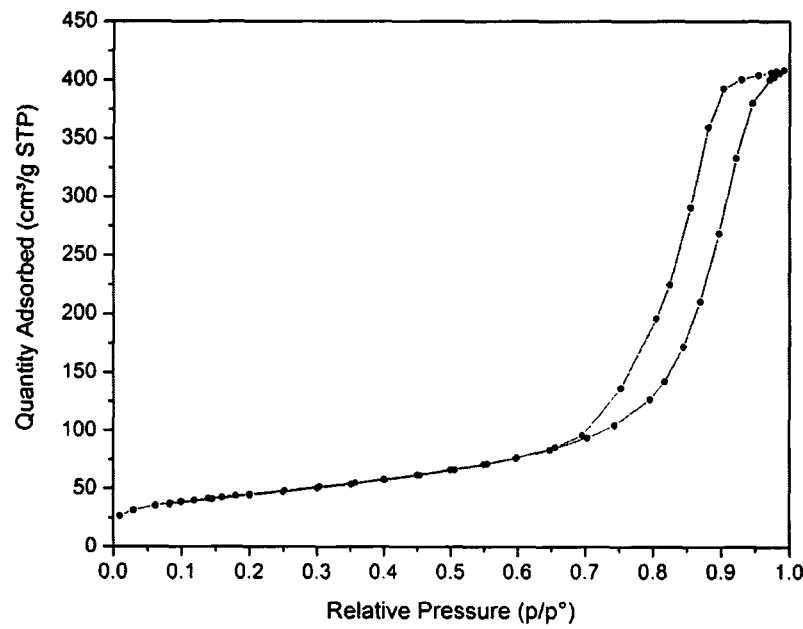
FIG. 16 shows N$_2$ adsorption/desorption isotherm of MgAl$_2$O$_4$ core.

$N_2$ Adsorption/Desorption: FIG. 16 shows $N_2$ adsorption/desorption isotherm of catalyst support $MgAl_2O_4$. The results indicated that the prepared support was mainly mesoporous with the pore diameter between 2-15 nm. The BET surface area was approximately 158 $m^2/g$. The adsorption average pore width (4 V/A) was approximately 15.9 nm and the adsorption average pore diameter (4 V/A) was 13.6 nm. BJH desorption analysis gave an average pore diameter (4 V/A) of approximately 11.1 nm. The nitrogen adsorption/desorption isotherm was classified as a type III isotherm typical of mesoporous materials. According to IUPAC classification, the hysteresis loop was of type H3. This type of hysteresis is usually found on solids consisting of aggregates or agglomerates of particles forming slit shaped pores.

Phase Analysis: X-ray patterns (XRD) were collected with Empyrean X-ray diffractometer filtered CuKα radiation

TABLE 3

| Catalyst | Composition |
| --- | --- |
| $Ni/Nb—CeO_2$ | 15 wt % $CeO_2$ + 1 wt % Nb + 7.5 wt % Ni + 76.5 wt % $MgAl_2O_4$ |
| $Ni/Ga—CeO_2$ | 15 wt % $CeO_2$ + 1 wt % Ga + 7.5 wt % Ni + 76.5 wt % $MgAl_2O_4$ |
| $Ni/La—CeO_2$ | 15 wt % $CeO_2$ + 1 wt % La + 7.5 wt % Ni + 76.5 wt % $MgAl_2O_4$ |
| $Ni/In—CeO_2$ | 15 wt % $CeO_2$ + 1 wt % In + 7.5 wt % Ni + 76.5 wt % $MgAl_2O_4$ |
| $Ni/CeO_2$ | 15 wt % $CeO_2$ + 7.5 wt % Ni + 77.5 wt % $MgAl_2O_4$ |
| $NiRh/Nb—CeO_2$ | 15 wt % $CeO_2$ + 1.43 wt % Nb + 2.5 wt % Rh + 7.5 wt % Ni + 73.57 wt % $MgAl_2O_4$ |
| $NiRh/Bi—CeO_2$ | 15 wt % $CeO_2$ + 1.43 wt % Bi + 2.5 wt % Rh + 7.5 wt % Ni + 73.57 wt % $MgAl_2O_4$ |
| $NiRh/Ga—CeO_2$ | 15 wt % $CeO_2$ + 1.43 wt % Ga + 2.5 wt % Rh + 7.5 wt % Ni + 73.57 wt % $MgAl_2O_4$ |
| $NiRh/La—CeO_2$ | 15 wt % $CeO_2$ + 1.43 wt % La + 2.5 wt % Rh + 7.5 wt % Ni + 73.57 wt % $MgAl_2O_4$ |
| $NiRh/In—CeO_2$ | 15 wt % $CeO_2$ + 1.43 wt % In + 2.5 wt % Rh + 7.5 wt % Ni + 73.57 wt % $MgAl_2O_4$ |
| $NiRh/CeO_2$ | 15 wt % $CeO_2$ + 2.5 wt % Rh + 7.5 wt % Ni + 75 wt % $MgAl_2O_4$ |
| $NiPt/Nb—CeO_2$ | 15 wt % $CeO_2$ + 1.43 wt % Nb + 2.5 wt % Pt + 7.5 wt % Ni + 73.57 wt % $MgAl_2O_4$ |
| $NiPt/Bi—CeO_2$ | 15 wt % $CeO_2$ + 1.43 wt % Bi + 2.5 wt % Pt + 7.5 wt % Ni + 73.57 wt % $MgAl_2O_4$ |
| $NiPt/Ga—CeO_2$ | 15 wt % $CeO_2$ + 1.43 wt % Ga + 2.5 wt % Pt + 7.5 wt % Ni + 73.57 wt % $MgAl_2O_4$ |
| $NiPt/La—CeO_2$ | 15 wt % $CeO_2$ + 1.43 wt % La + 2.5 wt % Pt + 7.5 wt % Ni + 73.57 wt % $MgAl_2O_4$ |
| $NiPt/In—CeO_2$ | 15 wt % $CeO_2$ + 1.43 wt % In + 2.5 wt % Pt + 7.5 wt % Ni + 73.57 wt % $MgAl_2O_4$ |
| $NiPt/CeO_2$ | 15 wt % $CeO_2$ + 2.5 wt % Pt + 7.5 wt % Ni + 75 wt % $MgAl_2O_4$ |
| $Ni0.1Pt/In—CeO_2$ | 15 wt % $CeO_2$ + 1.0 wt % In + 0.1 wt % Pt + 15 wt % Ni + 68.9 wt % $MgAl_2O_4$ |
| $Ni15/In—CeO_2$ | 15 wt % $CeO_2$ + 1.0 wt % In + 15 wt % Ni + 69 wt % $MgAl_2O_4$ |

Example 12

Characterization of the Example 11 Catalysts

The catalysts from Example 11 were analyzed using temperature-programmed reduction, nitrogen adsorption/desorption and X-ray diffraction methods.

Figure 15:
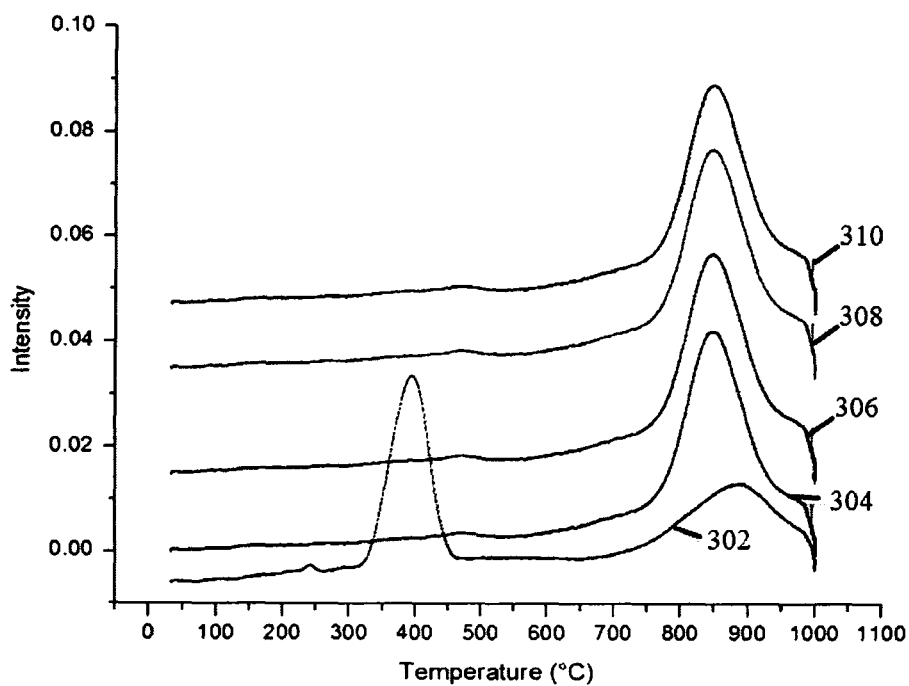
FIG. 15 shows temperature-programed reduction (TPR) profile for various doped Ni/X—CeO2 catalysts with a MgAl$_2$O$_4$ core.
Figure 17:
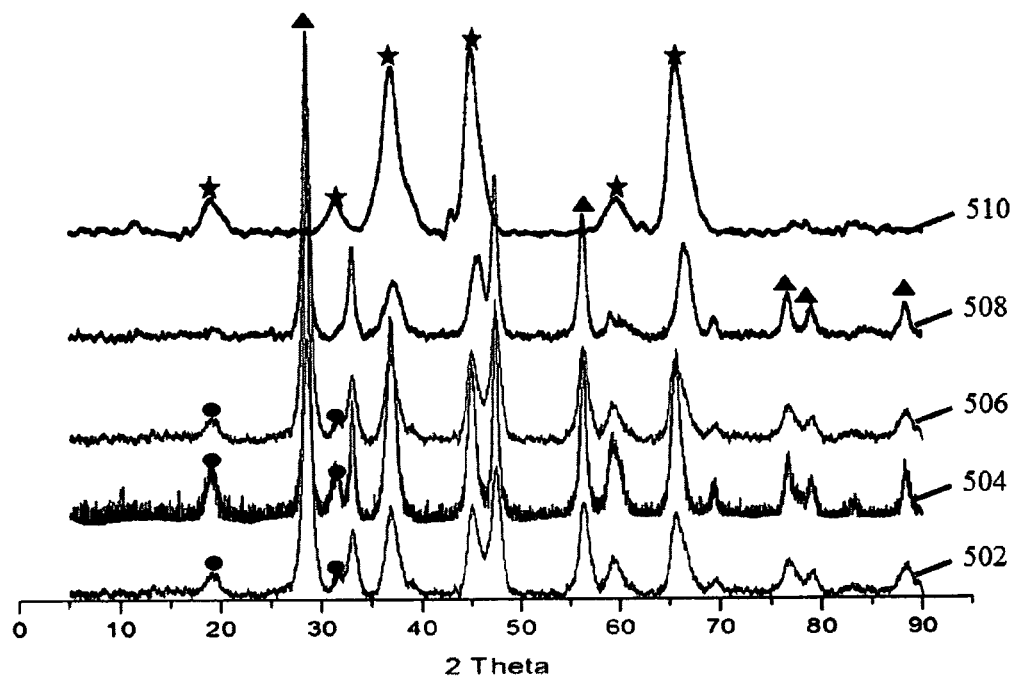
FIG. 17 shows X-Ray diffractograms of the various catalysts of the present invention with a MgAl$_2$O$_4$ core.

Temperature-Programmed Reduction (TPR): FIG. 15 shows the temperature-programmed reduction (TPR) profiles of different $Ni/X—CeO_2$ catalysts: $Ni/CeO_2$ (302), at 45 kV and 40 mA. The powder was scanned in the range between 2 θ=5-90°. The crystalline phases were identified using the International Center for Diffraction Data (ICDD). The XRD patterns of supported Ni catalysts are shown in FIG. 17 and neat $MgAl_2O_4$. Pattern 502 is catalyst $Ni/Nb—CeO_2$, pattern 504 is catalyst $Ni/La—CeO_2$, pattern 507 is catalyst $Ni/In—CeO_2$, pattern 508 is catalyst $Ni/CeO_2$ and pattern 510 is neat $MgAl_2O_4$. Phases corresponding to $CeO_2$ (solid triangle) ICDD=00-043-1002; NiO (solid circle) ICDD=01-089-8397 and $MgAl_2O_4$ (solid star) ICDD=OI- 073-1959. Diffraction patterns 190 and 180 correspond to NiO supported on neat $MgAl_2O_4$ and $CeO_2$ respectively. The $CeO_2$ diffraction peaks were observed at $2\theta=29°$, $33°$, $47°$, $57°$, $69°$ and $77°$ as shown in diffraction pattern 180. Diffraction patterns 150, 160 and 170 correspond to Ni/Nb—$CeO_2$, Ni/La—$CeO_2$ and Ni/In—$CeO_2$, respectively. All prominent diffraction patterns due to NiO, $CeO_2$ and $MgAl_2O_4$ are visible in diffraction patterns 150, 160 and 170. The NiO diffraction patterns were more difficult to detect because of overlap with the $MgAl_2O_4$ peaks at $2\theta$ equal to $19°$, $38°$ and $45.7°$. Without wishing to be bound by theory, it is believed that this was a good indication that the NiO in the Ni/X—$CeO_2$/$MgAl_2O_4$ catalysts were finely dispersed, and was a reason for the high stability performance of the Ni/X—$CeO_2$/$MgAl_2O_4$ catalyst in dry reforming of methane. The doped metal In, La, and Nb where undetectable in the diffractograms as their concentration was below XRD detection limit.

Example 13

Dry Reforming of Methane of the Example 11 Catalysts

Catalysts testing for the Example 11 catalysts was performed in a high throughput reactor system supplied by HTE (Germany). Reactors were of plug flow type and made up of steel, with an inner ceramic liner. Ceramic liner with 5 mm in diameter and 60 cm in length was used to avoid coking due to methane cracking on steel surface. Catalyst pellets were crushed and sieved between 300-500 μm. Catalyst sieve fraction was placed on top of inert material inside the ceramic liner. A mixture of 45% $CO_2$+45% $CH_4$+10% Ar was used as feed. Argon was used as an internal standard for GC analysis. The catalyst in oxidized state was heated to 800° C. in the presence of 90% $N_2$+10% Ar. The $CH_4$+$CO_2$ mixture was dosed in 4 steps with 5 minutes intervals replacing equivalent amount of nitrogen in each step. After reaching feed composition of 45% $CO_2$+45% $CH_4$+10% Ar, gas analysis was started after 1 hour of equilibration time. Agilent GC 7867 was used for gas analysis. Methane and $CO_2$ conversion was calculated as follows.

$$\text{Methane conversion} = \frac{\text{mol of methane converted}}{\text{mol of methane in feed}} \times 100$$

$$\text{Carbon dioxide conversion} = \frac{\text{mol of carbon dioxide converted}}{\text{mol of carbon dioxide in feed}} \times 100$$

The ratio of hydrogen to carbon monoxide is calculated as follows, $$H2/CO = \frac{\text{mol of Hydrogen in product}}{\text{mol of carbon monoxide in product}},$$

Figure 18:
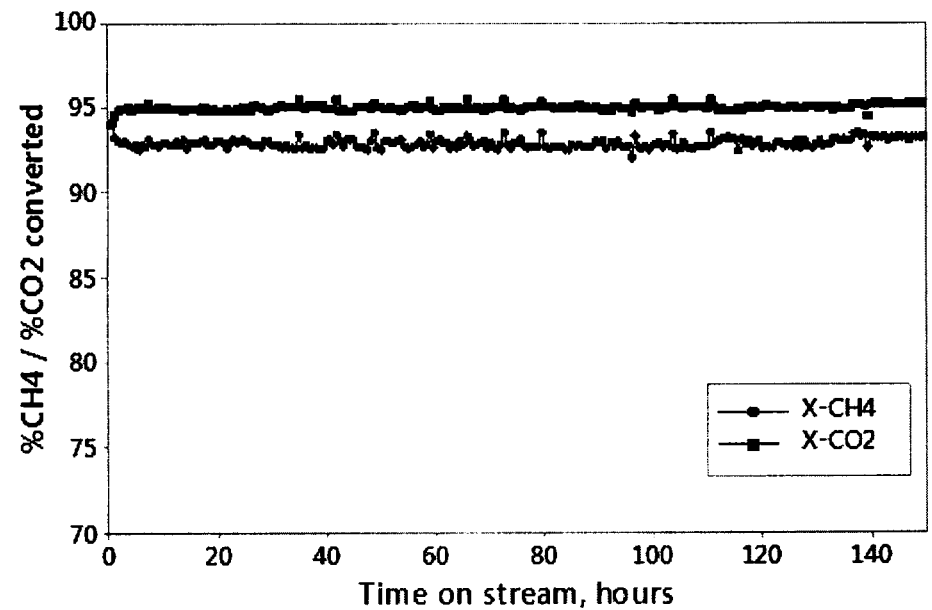
FIG. 18 shows graphs of Ni/Nb—CeO2 catalyst performance in the dry reforming methane reaction at 1 bar. The catalyst has a MgAl$_2$O$_4$ core.
Figure 18:
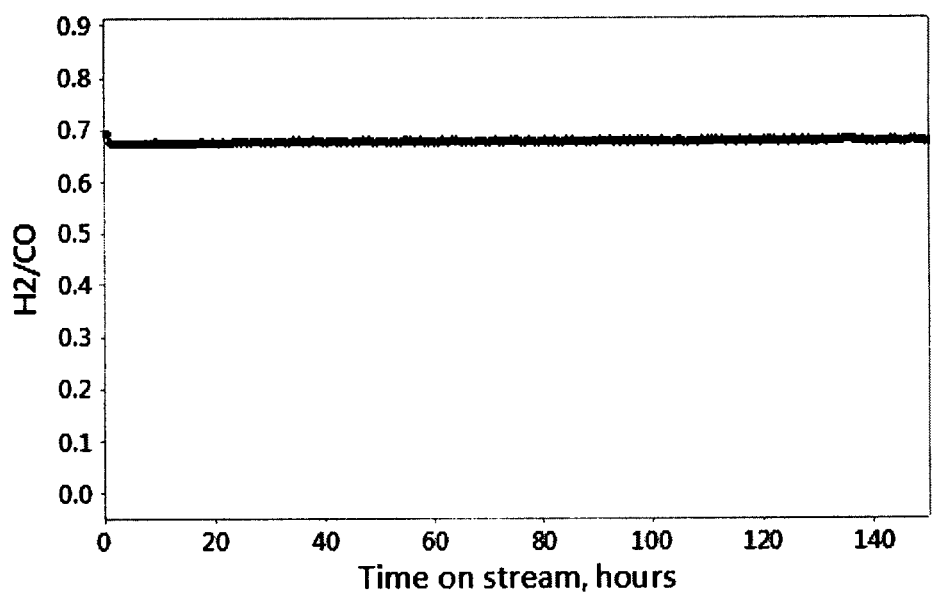

FIG. 18 shows graphs of catalytic performance of the Ni supported on Nb—$CeO_2$/$MgAl_2O_4$ catalyst obtained at 800° C., 1 bara and GHSV=4500 ml $h^{-1}$ $g^{-1}$ using 45% $CH_4$+45% $CO_2$+10% Ar as feed. $CH_4$/$CO_2$ conversion is shown on the left with $CO_2$ conversion on top (95%) and $CH_4$ conversion being the bottom line (94%), and $H_2$/CO ratio is shown on the right. The catalyst exhibited stable performance for more than 150 hours on stream without any deactivation. The $H_2$/CO ratio of 0.68 obtained remained constant throughout the duration of experimental.

Figure 19:
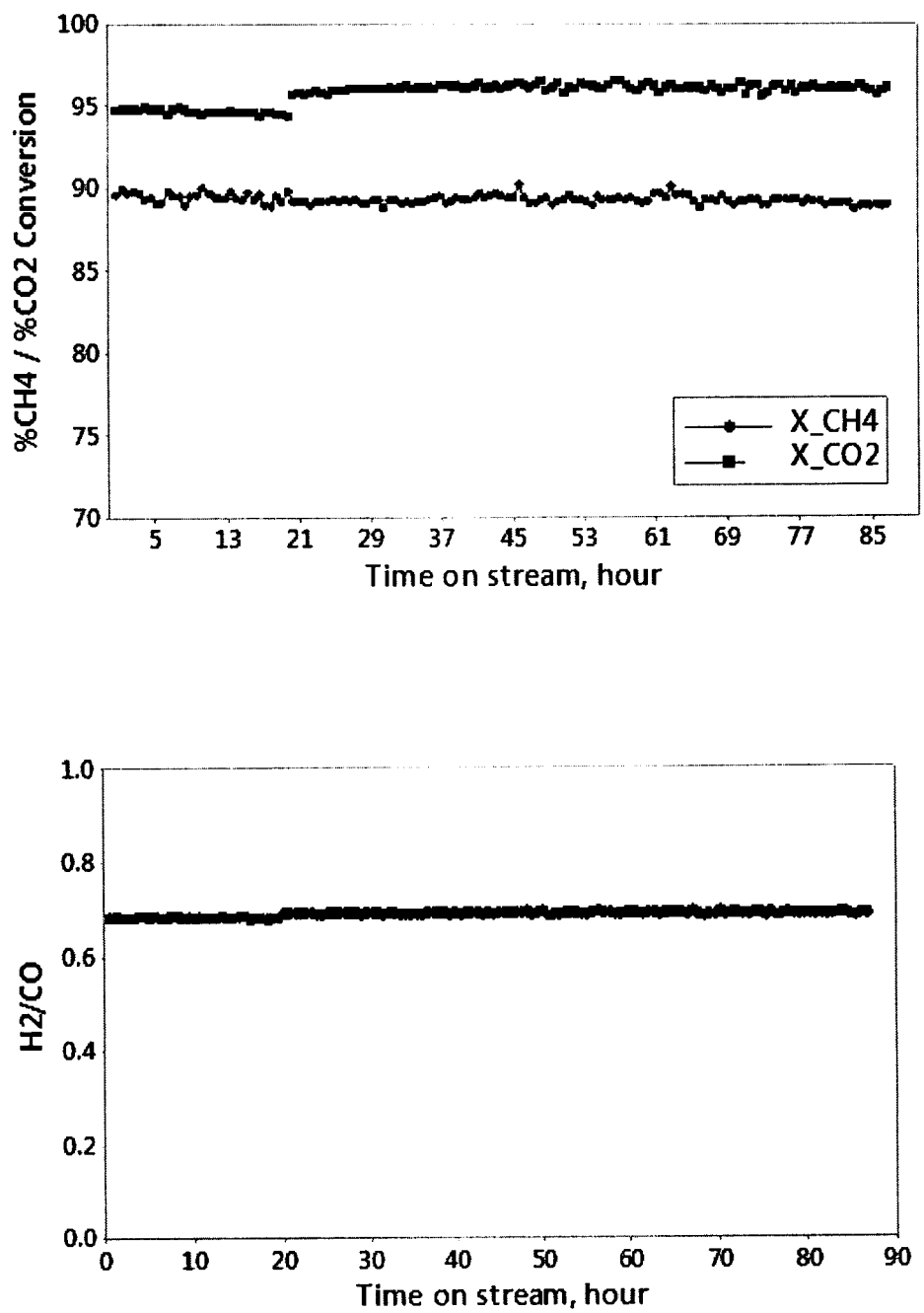
FIG. 19 shows graphs of Ni/La—CeO2 catalyst performance in the dry reforming methane reaction at 1 bar. The catalyst has a MgAl$_2$O$_4$ core.

FIG. 19 shows graphs catalytic performance of the Ni supported on La—$CeO_2$/$MgAl_2O_4$ catalyst obtained at 800° C., 1 bara and GHSV=4500 ml $h^{-1}$ $g^{-1}$ using 45% $CH_4$+45% $CO_2$+10% Ar as feed. $CH_4$/$CO_2$ conversion is shown on the left with $CO_2$ conversion on top (95%) and $CH_4$ conversion being the bottom line (90%), and $H_2$/CO ratio is shown on the right. The catalyst exhibited a stable performance for more than 80 hours on stream without any deactivation. The $H_2$/CO ratio of 0.68 obtained remained constant throughout the duration of experimental.

Figure 20:
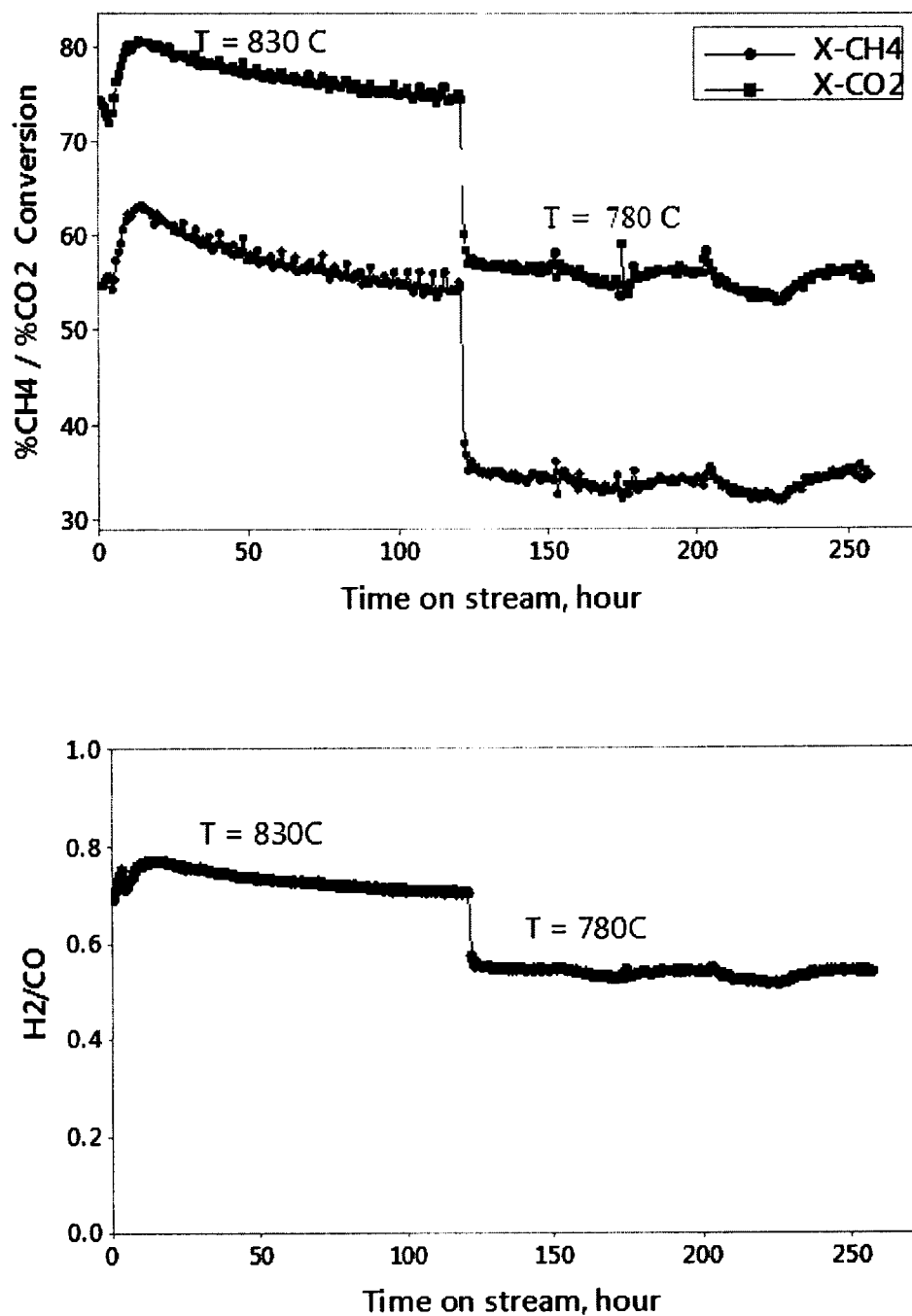
FIG. 20 shows Ni/In—CeO2 catalyst performance in the dry reforming methane reaction at 20 bar. The catalyst has a MgAl$_2$O$_4$ core.

FIG. 20 shows the performance of the Ni supported on In—$CeO_2$ catalyst at two different temperatures at 20 bara pressure. $CH_4$/$CO_2$ conversion is shown on the left with $CO_2$ conversion on top data points and $CH_4$ conversion being the bottom data points, and $H_2$/CO ratio is shown on the right. Gas mixture containing 45% $CH_4$+45% $CO_2$+10% Ar was used as feed and GHSV=4500 ml $h^{-1}$ $g^{-1}$. $CH_4$ conversion started at 65% and slowly decreased to 55%, while $CO_2$ conversion decreased from 81% to 76% after 125 h time on stream at 830° C. $H_2$/CO ratio decreased from 0.77 to 0.71 over 125 h time on stream. At 780° C., the $CH_4$ and $CO_2$ conversion remained constant at about 35% and about 67% respectively. Moreover, the $H_2$/CO ratio remained almost the same around 0.55 over 130 h time on stream.

Figure 21:
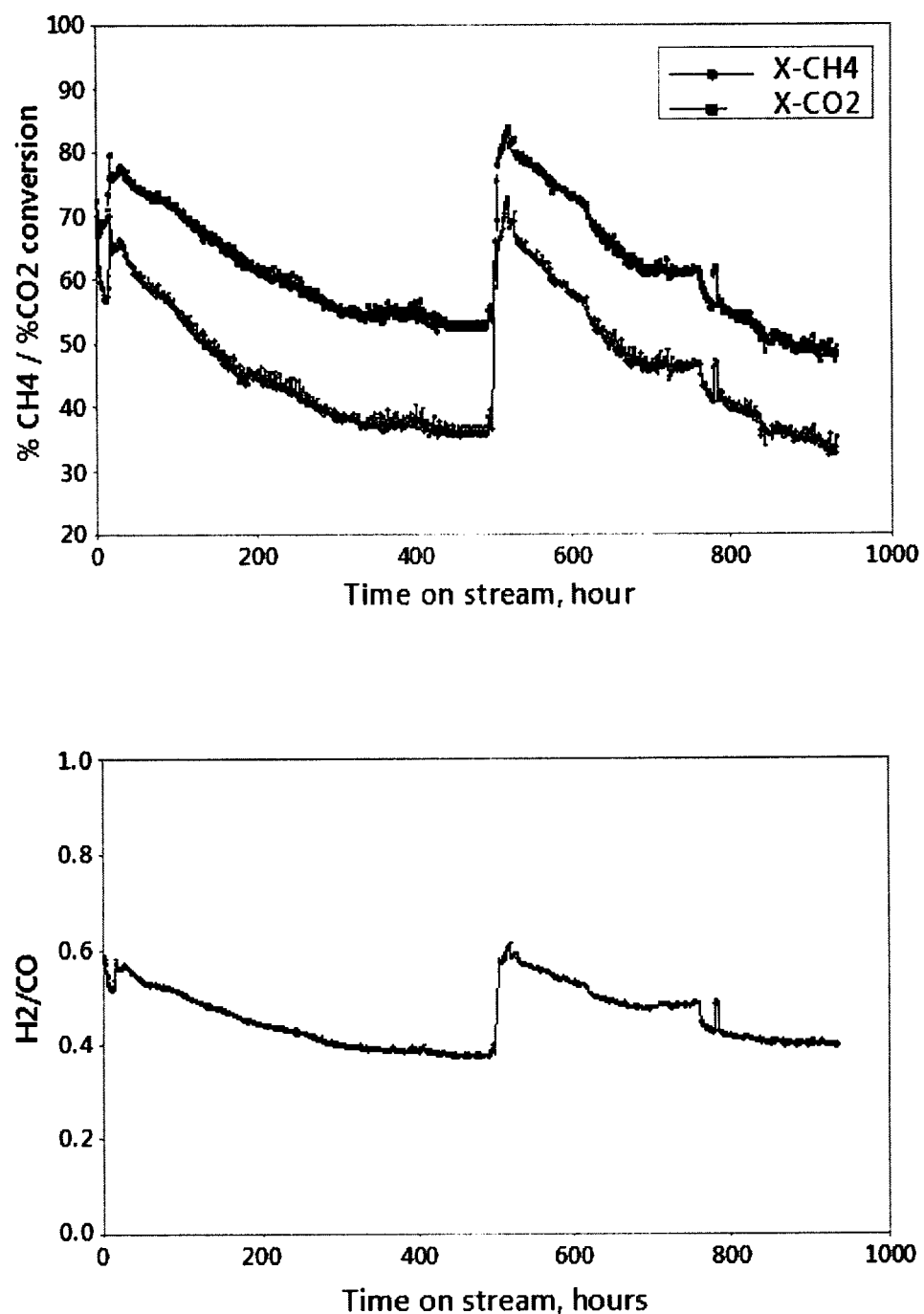
FIG. 21 shows the Ni/Nb—CeO$_2$ catalyst performance in the dry reforming methane reaction and 20 bar. The catalyst has a MgAl$_2$O$_4$ core.

FIG. 21 shows graphs of the Ni supported on Nb—$CeO_2$/$MgAl_2O_4$ catalyst at 1 bar tested at 20 bar and 800° C. reaction conditions. $CH_4$/$CO_2$ conversion is shown on the left with $CO_2$ conversion being the top data points and $CH_4$ conversion being the bottom data point, and $H_2$/CO ratio is shown on the right. A gas mixture containing 45% $CH_4$+ 45% $CO_2$+10% Ar was used as feed. It was observed that the catalyst underwent slow deactivation and lost about 30% activity over 500 hours of usage. The catalyst was regenerated by using pure $CO_2$ at 20 bara. As shown, catalyst regeneration was started after 500 hours on stream. Regeneration was performed using 50 ml/min $CO_2$ for 5 h. After regeneration, the catalyst regained the original activity of about 70% $CH_4$ and 80% $CO_2$ conversion as evidenced by the spikes in the graph. Increased $CO_2$ conversion resulted from reverse water gas reaction where $CO_2$ and $H_2$ reacted to form $H_2O$, which was determined to be the main reason for a low $H_2$/CO ratio of 0.4-0.6 in the product gases. The $H_2$/CO ratio was increased up to 0.9 by lowering the GHSV and increasing the conversion. By regenerating every 500 hours, or alternatively by using continuously regeneration such as in fluidized catalytic cracking (FCC) or moving bed technology, this catalyst system can be used for high-pressure applications.

Figure 22:
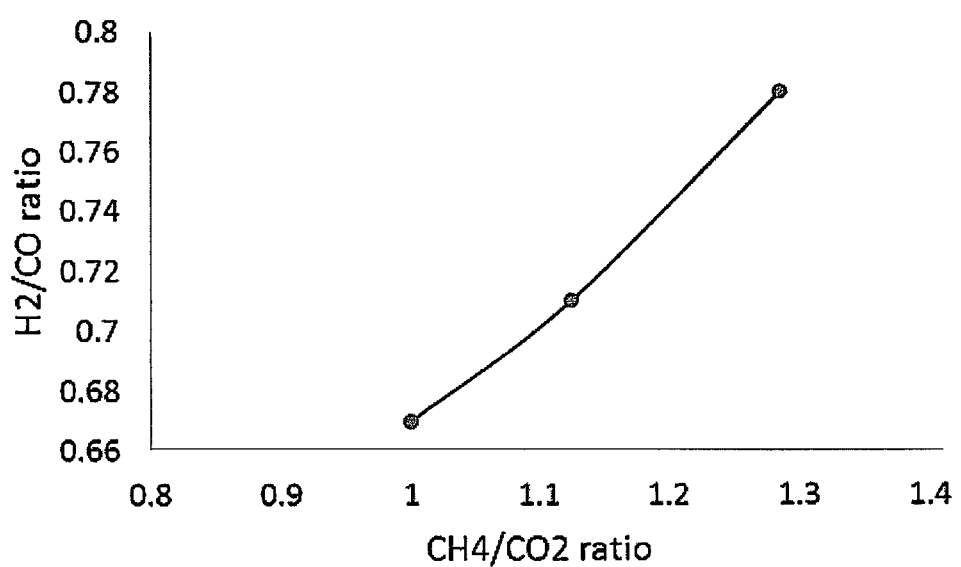
FIG. 22 shows graphs of the variation of H$_2$/CO ratio with respect to CH$_4$/CO$_2$ ratio in the feed for the nickel supported on Nb—CeO$_2$ catalyst. The catalyst has a MgAl$_2$O$_4$ core.

FIG. 22 shows graphs the variation of $H_2$/CO ratio with respect to $CH_4$/$CO_2$ ratio in the feed using a Ni supported on Nb—$CeO_2$ catalyst at a temperature of 800° C. pressure of 20 bara, and GHSV 4500 ml $h^{-1}$ $g^{-1}$. Due to the reverse water gas reaction, $H_2$/CO ratio usually remained lower than theoretical value of 1 in the reformed gas. One option was to increase the $CH_4$/$CO_2$ ratio. As shown by increasing the $CH_4$/$CO_2$ ratio from 1 to 1.3, the $H_2$/CO ratio also increased from 0.67 to 0.78.

Out of the several core shell synthesized catalysts, nickel supported on indium, lanthanum and niobium doped $CeO_2$ shell over the core support structure of $MgAl_2O_4$ show an extraordinary stability towards sintering and resistance to coking at pressures from 1-20 bar and temperatures from 780-830° C. It is envisioned that similar behavior would be expected above 830° C. and up to 1000° C.

The invention claimed is:

1. A catalyst comprising a core-shell structure having:
a metal oxide core, a clay core, or a zeolite core;
a shell completely surrounding the core, wherein the shell has a redox-metal phase having tin (Sn), niobium (Nb), lanthanum (La), bismuth (Bi), indium (In) or gallium (Ga), or any combination thereof incorporated into the lattice framework of the redox-metal oxide phase; and
an active-metal deposited on the surface of the shell, wherein the redox-metal oxide phase is cerium oxide ($CeO_2$),
wherein the catalyst is capable of catalyzing the production of hydrogen ($H_2$) and carbon monoxide (CO) from methane ($CH_4$) and carbon dioxide ($CO_2$).

2. The catalyst of claim 1, wherein the metal oxide core is an alkaline earth metal aluminate core selected from magnesium aluminate, calcium aluminate, strontium aluminate, barium aluminate, or any combination thereof.

3. The catalyst of claim 2, wherein the alkaline earth metal aluminate core is magnesium aluminate.

4. The catalyst of claim 3, comprising:
65 wt. % to 85 wt. % magnesium aluminate;
10 wt. % to 20 wt. % cerium oxide; and
5 wt. % to 10 wt. % nickel.

5. The catalyst of claim 4, comprising 0.5 wt. % to 2 wt. % of niobium incorporated into the lattice framework of the redox-metal oxide phase.

6. The catalyst of claim 4, comprising 0.5 wt. % to 2 wt. % of indium incorporated into the lattice framework of the redox-metal oxide phase.

7. The catalyst of claim 4, comprising 0.5 wt. % to 2 wt. % of lanthanum incorporated into the lattice framework of the redox-metal oxide phase.

8. The catalyst of claim 1, wherein the active metal comprises nickel.

9. The catalyst of claim 1, wherein the core is $Al_2O_3$ and the metal deposited on the surface of the shell is nickel, rhodium, ruthenium, or platinum or any combination thereof.

10. The catalyst of claim 1, wherein the active metal deposited on the surface of the shell is nickel, rhodium, ruthenium, iridium, platinum, palladium, gold, silver, palladium, cobalt, manganese, copper, or any combination thereof.

11. The catalyst of claim 1, wherein the catalyst includes 5 to 50 wt. % of the redox-metal oxide phase, 0.1 to 5 wt. % of the metal dopant, and 1 to 40 wt. % of the active metal deposited on the surface of the shell.

12. A catalyst comprising a core-shell structure having:
a $MgAl_2O_4$ core;
a shell completely surrounding the core, wherein the shell has a cerium oxide phase having tin (Sn), niobium (Nb), lanthanum (La), bismuth (Bi), indium (In) or gallium (Ga), incorporated into the lattice framework of the cerium oxide phase; and
nickel deposited on the surface of the shell,
wherein the catalyst is capable of catalyzing the production of hydrogen ($H_2$) and carbon monoxide (CO) from methane ($CH_4$) and carbon dioxide ($CO_2$).

13. A system for producing hydrogen ($H_2$) and carbon monoxide (CO) from methane ($CH_4$) and carbon dioxide ($CO_2$), the system comprising:
an inlet for a reactant feed comprising $CH_4$ and $CO_2$;
a reaction zone that is configured to be in fluid communication with the inlet, wherein the reaction zone comprises the catalyst of claim 1; and
an outlet configured to be in fluid communication with the reaction zone and configured to remove a first product stream comprising $H_2$ and CO from the reaction zone.

14. A method of producing hydrogen ($H_2$) and carbon monoxide (CO) from methane ($CH_4$) and carbon dioxide ($CO_2$), the method comprising contacting a reactant gas stream that includes $CH_4$ and $CO_2$ with the catalyst of claim 1 under dry reaction conditions to produce a product gas stream comprising $H_2$ and CO, wherein the reaction conditions include a temperature of 700° C. to 950° C., a pressure of 1 bara, and a gas hourly space velocity of 500 $h^{-1}$ to 100,000 $h^{-1}$.

15. The method of claim 14, wherein the gas hourly space velocity is 73,500 $h^{-1}$.

16. The method of claim 14, wherein the temperature is 800° C.

17. A method of making the catalyst of claim 1, the method comprising:
(a) obtaining a solution comprising a redox-metal salt and a salt of tin (Sn), niobium (Nb), lanthanum (La), bismuth (Bi), indium (In) or gallium (Ga), or any combination thereof solubilized in the solution, wherein the weight ratio of the redox-metal salt to the salt of the Sn, Nb, La, Bi, In or Ga, or any combination thereof present in the solution is at least 5:1;
(b) impregnating a metal oxide core, a clay core, or a zeolite core, with the solution to obtain an impregnated material;
(c) drying and calcining the impregnated material to obtain a core-shell structure having:
(i) a metal oxide core, a clay core, or a zeolite core; and
(ii) a shell surrounding the core, wherein the shell has a redox-metal oxide phase formed from the redox-metal salt and Sn, Nb, La, Bi, In or Ga, or any combination thereof formed from the salt thereof that is incorporated into the lattice framework of the redox-metal oxide phase; and
(d) depositing one or more active metals on the surface of the shell.

18. The method of claim 17, wherein the impregnated material is dried at a temperature of 50 to 150° C. for 2 to 10 hours and calcined at a temperature of 500 to 800° C. for 2 to 4 hours.

19. A catalyst comprising a core-shell structure having:
a metal oxide core, a clay core, or a zeolite core;
a shell substantially surrounding the core, wherein the shell has a redox-metal oxide phase having tin (Sn), niobium (Nb), lanthanum (La), bismuth (Bi), indium (In) or gallium (Ga) or a combination thereof, incorporated into the lattice framework of the redox-metal oxide phase; and
an active metal deposited on the surface of the shell, wherein the redox-metal oxide phase is cerium oxide,
wherein the catalyst is capable of catalyzing the production of hydrogen ($H_2$) and carbon monoxide (CO) from methane ($CH_4$) and carbon dioxide ($CO_2$).

20. A method of making the catalyst of claim 19, the method comprising:
(a) obtaining a solution comprising a redox-metal salt and a salt of tin (Sn), niobium (Nb), lanthanum (La), bismuth (Bi), indium (In) or gallium (Ga), solubilized in the solution, wherein the weight ratio of the redox-metal salt to the salt of the metal dopant present in the solution is at least 5:1;
(b) impregnating the metal oxide core, the clay core, or the zeolite core with the solution to obtain an impregnated material;

(c) drying and calcining the impregnated material to obtain the core-shell structure having:
  (i) the metal oxide core, the clay core, or the zeolite core; and
  (ii) the shell substantially surrounding the core, wherein the shell has the redox-metal oxide phase formed from the redox-metal salt and Sn, Nb, La, Bi, In or Ga, or any combination thereof formed from the salt thereof that is incorporated into the lattice framework of the redox-metal oxide phase; and
(d) depositing one or more active metals on the surface of the shell to obtain the catalyst.

\* \* \* \* \*